(12) United States Patent
Nomi et al.

(10) Patent No.: US 6,843,726 B1
(45) Date of Patent: Jan. 18, 2005

(54) GAME SYSTEM

(75) Inventors: Mitsuhiro Nomi, Kobe (JP); Satoshi Ueno, Kobe (JP); Yasuhiro Noguchi, Kobe (JP)

(73) Assignee: Konami Corporation, Tokyo-to (JP)

( * ) Notice: Subject to any disclaimer, the term of this patent is extended or adjusted under 35 U.S.C. 154(b) by 207 days.

(21) Appl. No.: 09/655,656

(22) Filed: Sep. 5, 2000

(30) Foreign Application Priority Data

Sep. 7, 1999 (JP) .......................................... 11-253686

(51) Int. Cl.[7] .......................... A63F 13/00; A63F 9/24; G06F 17/00; G06F 19/00; G09B 5/00

(52) U.S. Cl. ................................ 463/43; 463/1; 463/7; 463/23; 463/46; 463/47; 434/307 A; 434/308; 434/320; 273/148 R; 700/91; 700/92

(58) Field of Search ............................ 463/43, 1, 2, 6, 463/7, 23, 30, 31, 35–38, 44, 46, 47, 59, 60; 434/307 A, 308, 318, 320; 700/90–92; 273/148 R, 309

(56) References Cited

U.S. PATENT DOCUMENTS

| | | | | |
|---|---|---|---|---|
| 3,834,702 | A | * | 9/1974 | Bliss .............................. 463/6 |
| 4,752,069 | A | | 6/1988 | Okada |
| 5,218,580 | A | * | 6/1993 | Okamura et al. ............... 369/2 |
| 5,223,658 | A | * | 6/1993 | Suzuki .......................... 84/663 |
| 5,475,214 | A | | 12/1995 | DeFranco et al. |
| 5,513,129 | A | * | 4/1996 | Bolas et al. ................... 703/13 |
| 5,737,505 | A | * | 4/1998 | Shaw et al. ................. 345/419 |
| 5,739,457 | A | * | 4/1998 | Devecka ...................... 84/743 |
| 6,001,013 | A | * | 12/1999 | Ota ................................ 463/7 |
| 6,097,927 | A | * | 8/2000 | LaDue ........................ 434/308 |
| 6,206,700 | B1 | * | 3/2001 | Brown et al. ................ 434/116 |
| 6,227,968 | B1 | * | 5/2001 | Suzuki et al. .................... 463/7 |
| 6,241,612 | B1 | * | 6/2001 | Heredia ........................ 463/42 |
| 6,267,600 | B1 | * | 7/2001 | Song ...................... 434/307 A |
| 6,270,414 | B2 | * | 8/2001 | Roelofs ......................... 463/36 |
| 6,283,764 | B2 | * | 9/2001 | Kajiyama et al. ........ 434/307 A |
| 6,352,432 | B1 | * | 3/2002 | Tsai et al. ................ 434/307 A |
| 6,379,244 | B1 | * | 4/2002 | Sagawa et al. ................. 463/7 |
| 6,514,083 | B1 | * | 2/2003 | Kumar et al. ........... 434/307 A |

FOREIGN PATENT DOCUMENTS

| | | |
|---|---|---|
| CN | 1053163 | 12/1990 |
| EP | 0903169 | 3/1999 |
| JP | 62-281986 | 7/1987 |
| JP | 4-275749 | 10/1992 |
| JP | 5-82488 | 11/1993 |
| JP | 7-288667 | 10/1995 |
| JP | 7-299948 | 11/1995 |
| JP | 8-305356 | 11/1996 |
| JP | 9-160752 | 6/1997 |
| TW | 85107067 | 7/1997 |

OTHER PUBLICATIONS

Aug. 24, 2004, Pre–Appeal Report in JP Application No. 11–253686 Takashi Murayama.

* cited by examiner

*Primary Examiner*—A. L. Wellington
*Assistant Examiner*—Binh-An D. Nguyen
(74) *Attorney, Agent, or Firm*—Jordan and Hamburg LLP

(57) ABSTRACT

A game system is provided with a converting means including a voice input member, such as a microphone, for allowing the game player or his/her friend to input voices and for converting the inputted voices into electrical signal data, a sound data storage for storing the electrical signal data obtained by the conversion together with predetermined sound-relating data corresponding to contents of instructions, a sound generator for generating voices from the corresponding electrical signal data when a game player makes a motion in response to the content of instruction, and a device for evaluating a game result based on the content of instruction. Accordingly, a sound output type game system which can provide more interesting and enjoyable games can be realized.

18 Claims, 23 Drawing Sheets

FIG.10

| MONKEY | MONKEY SOUND |
|--------|--------------|
| FUNKY | FUNKY SOUND |
| WOMAN | FEMALE SOUND |
| NORMAL | NONE |
| MAN | MALE SOUND |
| HUSKY | HUSKY SOUND |
| MONSTER | MONSTER SOUND |
| ROBOT | ROBOT SOUND |

FIG.17

RANKING

| | | |
|---|---|---|
| 1st | A B C | 0123456789 |
| 2nd | A B C | 0123456789 |
| 3rd | A B C | 0123456789 |
| 4th | A B C | 0123456789 |
| 5th | A B C | 0123456789 |
| 6th | A B C | 0123456789 |
| 7th | A B C | 0123456789 |
| 8th | A B C | 0123456789 |
| 9th | A B C | 0123456789 |
| 10th | A B C | 0123456789 |

3

| ORDER OF SOUND GENERATION | KINDS OF SOUND MODULATION | MODULATION BY SLIDER |
|---|---|---|
| SOUND DATA BLOCK 1 | NONE | CAN BE ADDED |
| SAMPLING DATA B | × MODULATION 1 | CAN BE ADDED |
| SAMPLING DATA A | × MODULATION 3 | CAN BE ADDED |
| SOUND DATA BLOCK 4 | NONE | CAN BE ADDED |
| SAMPLING DATA A | × MODULATION 1 | CAN BE ADDED |

GAME SYSTEM

The present invention relates to a novel game system which creates sounds or voices of a game player or others during a game.

BACKGROUND OF THE INVENTION AND RELATED ART STATEMENT

Various types of game systems are available including those which output sounds and those which do not output sounds.

Known game systems of the sound output type only output specified sounds set in the game systems beforehand and, thus, lack variety and diversity.

SUMMARY OF THE INVENTION

In view of the above situation, an object of the present invention is to provide a game of the sound output type having quite an improved variety and diversity.

In order to fulfill the above object, a game system according to this invention in which a game player make motions in response to contents of instructions displayed on a display screen and generating predetermined sounds corresponding to the contents of instructions, the game system comprises a voice converting means having an voice input member for inputting voices and for converting the voices input through the voice input member into electrical signal data, a storage means for storing the electrical signal data obtained by the voice converting means together with predetermined sound-relating data corresponding to the contents of instructions, and a sound generating means for generating voices from the corresponding electrical signal data based on the motions of the game player corresponding to the contents of instructions when the game player makes motions in response to the contents of instructions.

In this game system, when the game player makes a motion based on the content of instruction relating to the electrical signal data, the sound generating means generates the voice inputted through the voice input member corresponding to the electrical signal data based on the content of instruction. Accordingly, not only the specified sounds set in the game system beforehand, but also voices inputted and converted into the electrical signal data by the voice converting means such as those of the game player himself and those of the game player's friend can be outputted from the game system, thereby making the game extremely interesting and enjoyable.

These and other objects, features and advantages of the present invention will become more apparent upon a reading of the following detailed description and accompanying drawings.

BRIEF DESCRIPTION OF THE DRAWINGS

FIG. 10 is a list showing types of sound modulation and a selecting method of the sound modulation type by a slide switch provided in the game system, FIG. 17 is a diagram showing a content of an image (display content representing a ranking) displayed on the monitor.

DETAILED DESCRIPTION OF THE PREFERRED EMBODIMENTS OF THE INVENTION

Hereinafter, one embodiment of the invention is specifically described.

Figure 1:
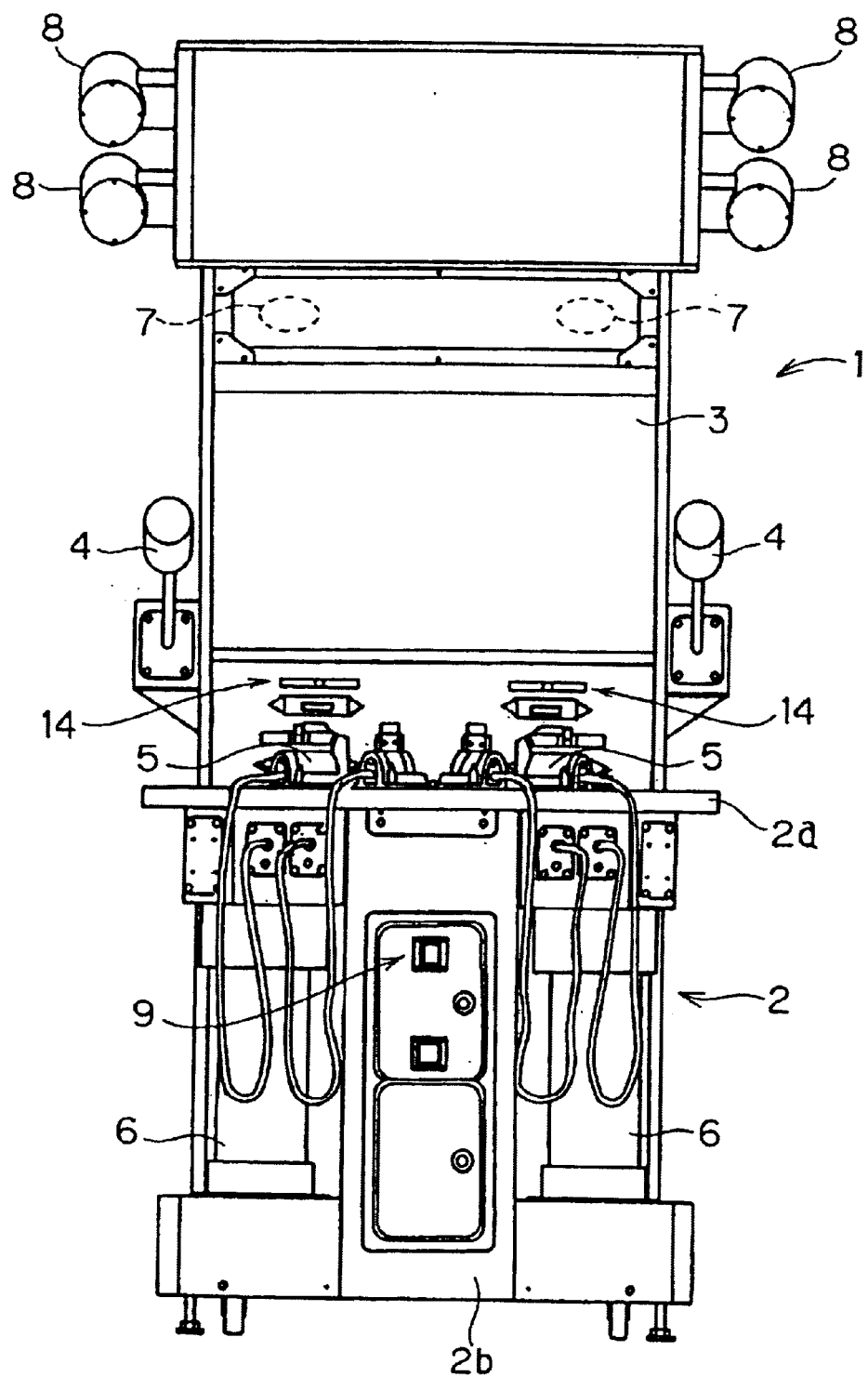
FIG. 1 is a front view of a game system according to one embodiment of the invention.
Figure 2:
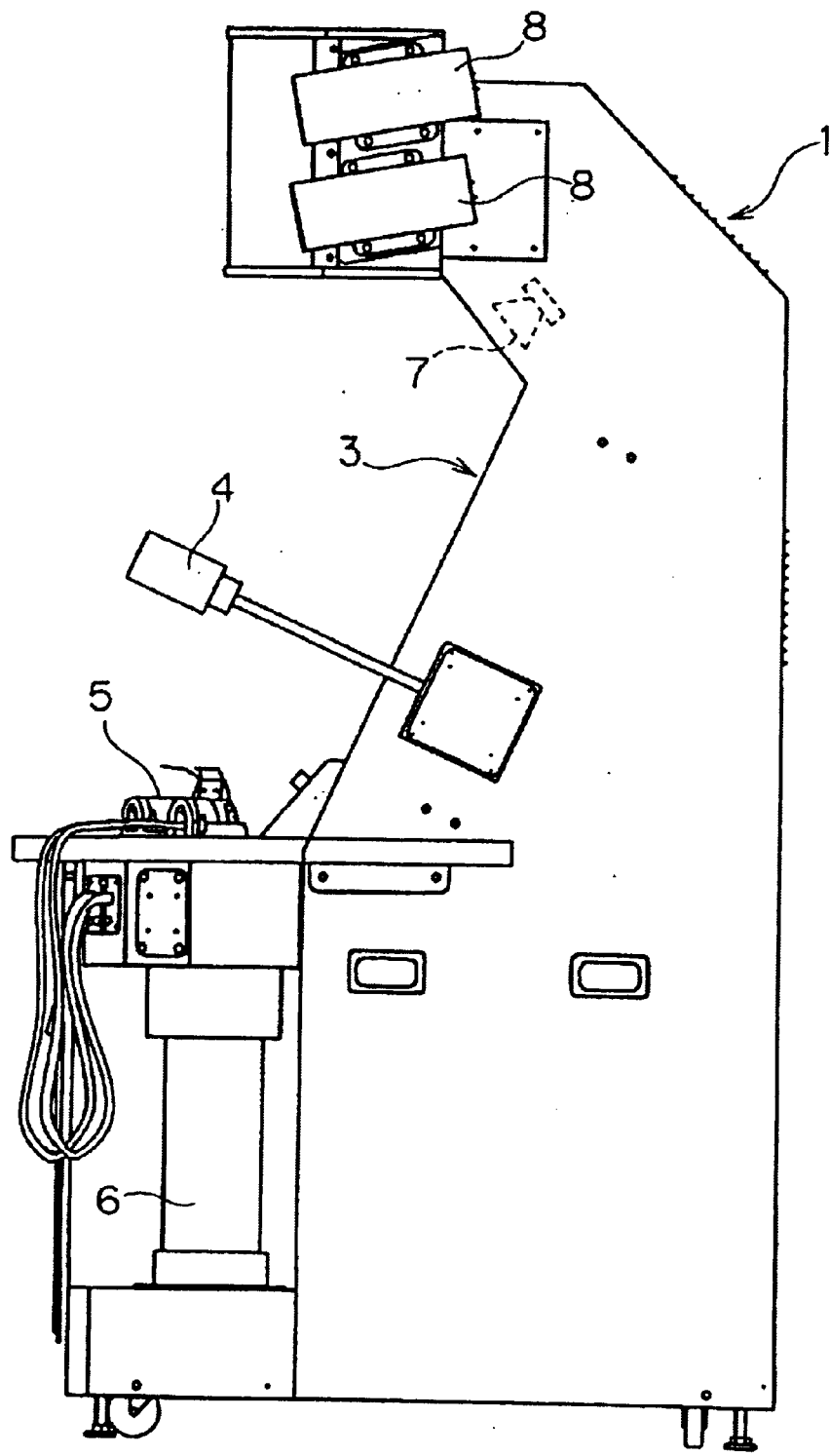
FIG. 2 is a right side view of the game system.

FIGS. 1 and 2 are a front view and a right side view of a game system according to this embodiment, respectively. In this embodiment, description is given on an example in which two players compete each other by hitting and swinging motions.

A game system 1 is provided with a base table 2, a television (TV) monitor 3 provided on the base table 2 for displaying game contents, microphones 4 provided at the opposite sides of the TV monitor 3 and used for inputting voices, four signal generating devices 5 placed on a placing portion 2a projecting forward at the top of the base table 2, woofer loudspeaker units 6 provided inside the opposite side portions of the base table 2, a loudspeaker 7 designed for the entire frequency band and provided above the TV monitor 3, illumination-effect lamps 8 provided above the loudspeaker 7, a coin inserting device 9 provided on a front surface 2b of the base table 2, two switch operation units 14 provided in left and right positions of the front surface 2b, and a control system 40 to be described later which is provided inside the game system 1.

Figure 3:
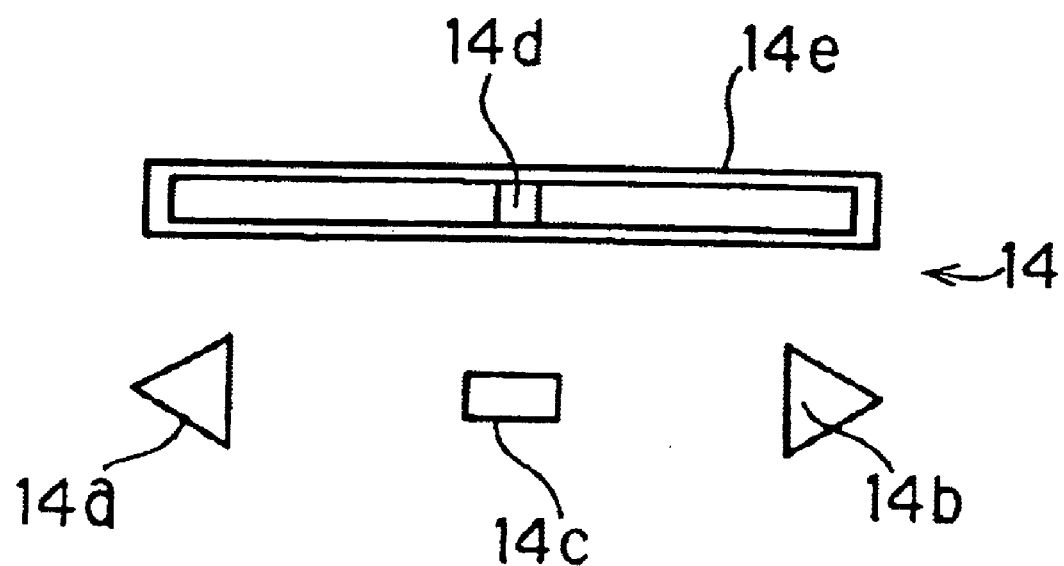
FIG. 3 is a front view showing a switch operation unit provided in the game system.

Each switch operation unit 14 is, as shown in FIG. 3, comprised of three operation buttons 14a, 14b, 14c and one slide switch 14d. The triangular operation buttons 14a and 14b provided at the opposite sides of the rectangular operation button 14c are pressed to select a music number and a degree of difficulty of a game based on a sound output from the loudspeaker 7 and a content of an image displayed on the TV monitor 3. This operation button 14c is also used to decide whether a single-player game or a duel-player game is to be played. For example, the single-player game is selected when the operation button 14c of the switch operation unit 14 provided at the left side of the front surface 2b, whereas the duel-player game is selected when the operation button 14c of the switch operation unit 14 provided at the right side of the front surface 2b. It is assumed that the operation buttons 14a, 14b and 14c of the left switch operation unit 14 on the front surface 2b are operated in the case that the single-player game is selected, and the operation buttons 14a, 14b and 14c of the left and right switch operation units 14 are operated in the case that the duel-player game is selected. The slide switch 14d provided at an upper part of each switch operation unit 14 is adapted to change types of sound modulation to be described by being slid to left and right, and a gauge portion 14e for measuring a sliding amount is provided around a slidable range of the slide switch 14d.

Figure 4:
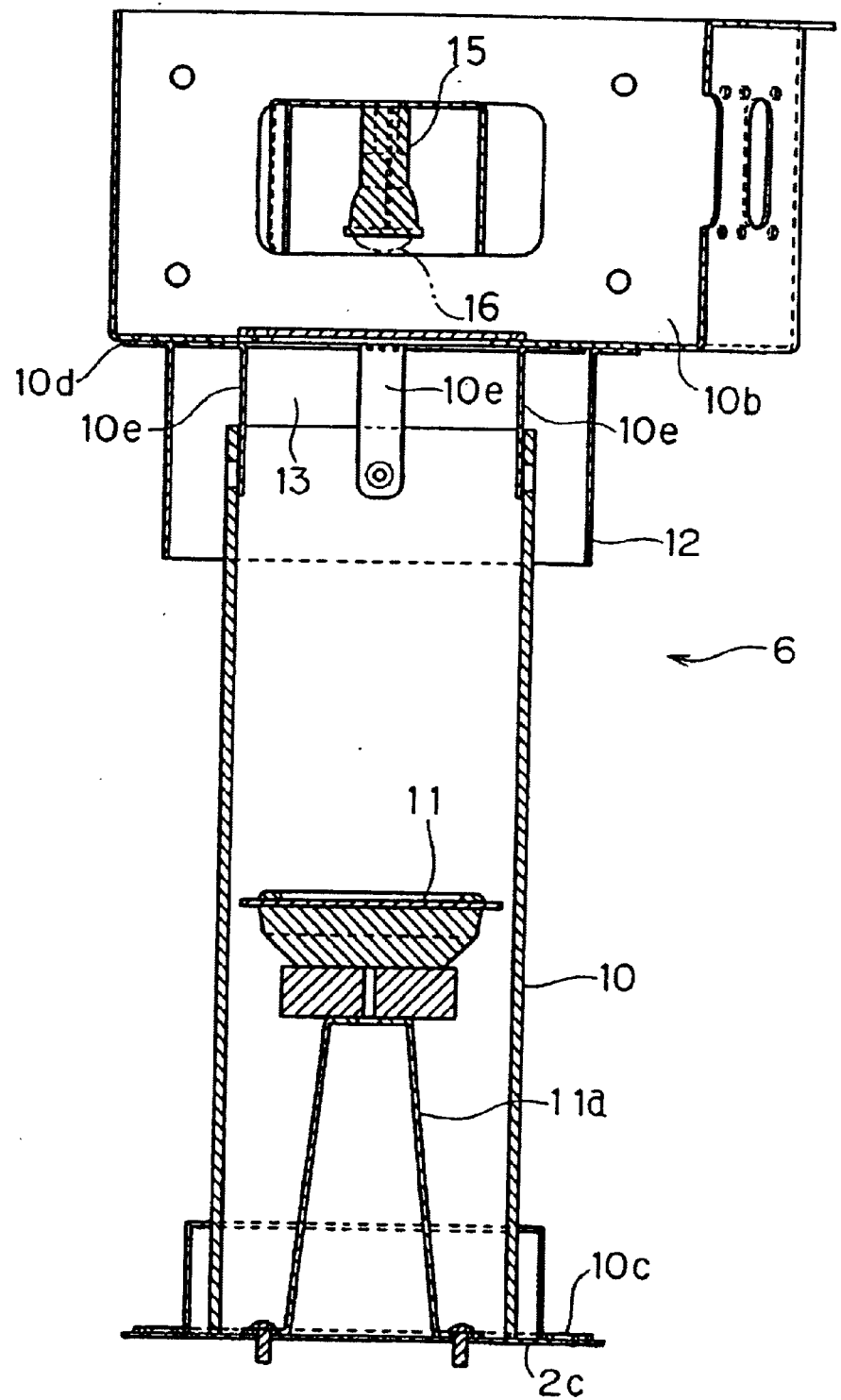
FIG. 4 is a front view in section showing a woofer loudspeaker provided in the game system.

Each loudspeaker unit 6 includes, as shown in FIG. 4, a box-shaped mount portion lab which is mounted inside the front surface 2b of the base table 2 and has an entirely open ceiling surface and a bottom surface open in its center, a transparent tubular body 10 having a circular cross section and suspended from the mount portion 10b via L-shaped supporting members 10e, a woofer loudspeaker 11 which is so provided inside the tubular body 10 via a supporting member 11a as to face upward, and a mount portion 10c on which the supporting member 11a is mounted and which is mounted on a bottom plate 2c of the base table 2.

The tubular body 10 is coupled to the mount portion 10b by mounting the L-shaped supporting members 10e in four positions of a bottom surface 10d of the mount portion 10b to support the tubular body 10. A clearance 13 is formed between the upper edge of the tubular body 10 and the bottom surface 10d so as to cause sounds created by the speaker 11 to come out. A tubular member 12 having a circular cross section is mounted on the bottom surface 10d in such a manner as to surround an upper part of the tubular body 10, and the sounds from the loudspeaker 11 coming out through the clearance 13 propagate downward inside the tubular member 12 to come outside. Inside the mount portion 10b is provided a light source mount portion 15, in which a light source 16 is mounted. Light from this light source 16 is guided down through an opening in the center of the bottom wall of the mount portion 10b to illuminate the speaker 11 and its neighboring members.

Figure 5:
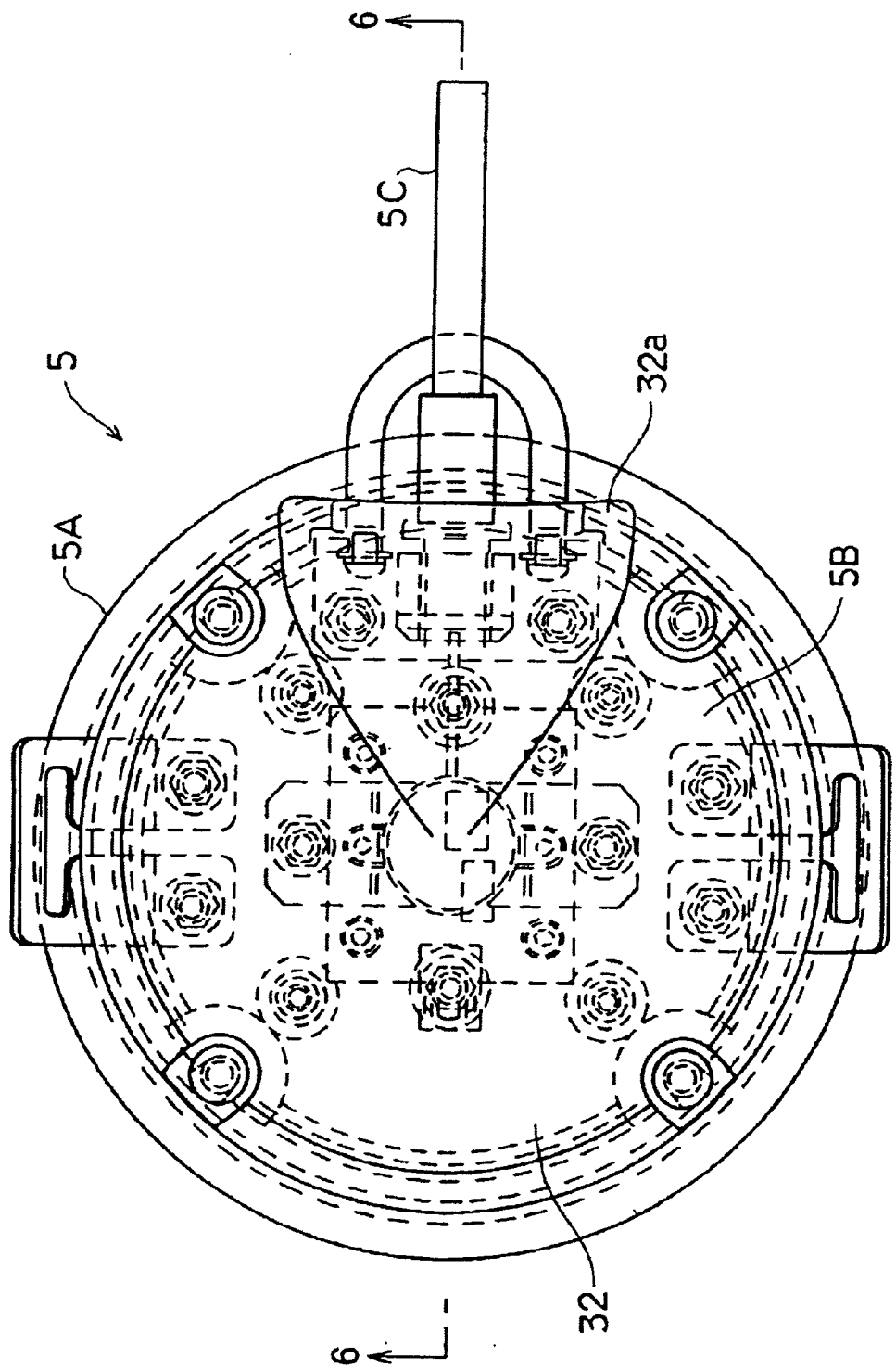
FIG. 5 is a plan view showing a signal generating device provided in the game system.
Figure 6:
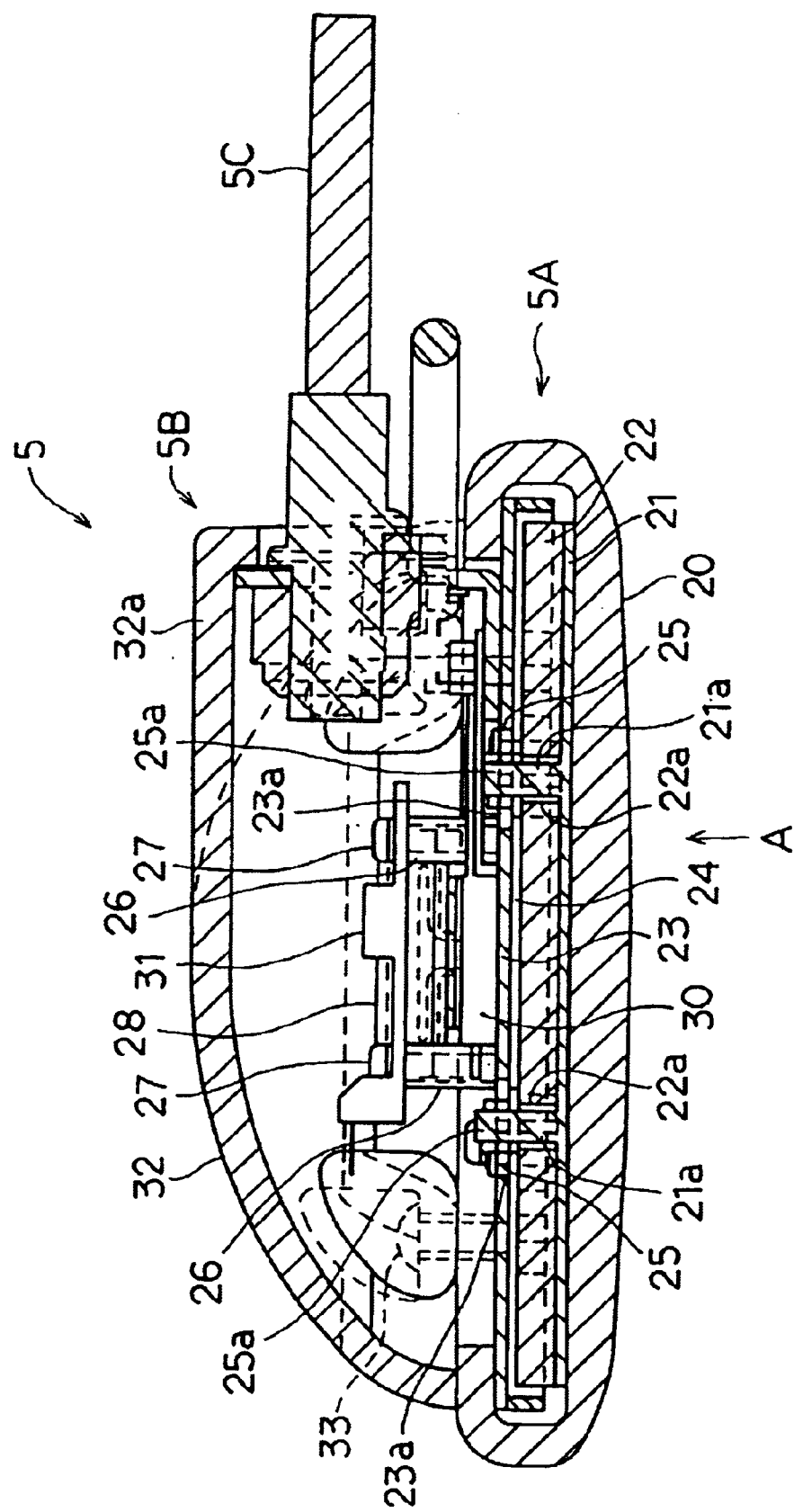
FIG. 6 is a section along 6—6 of FIG. 5.
Figure 7:
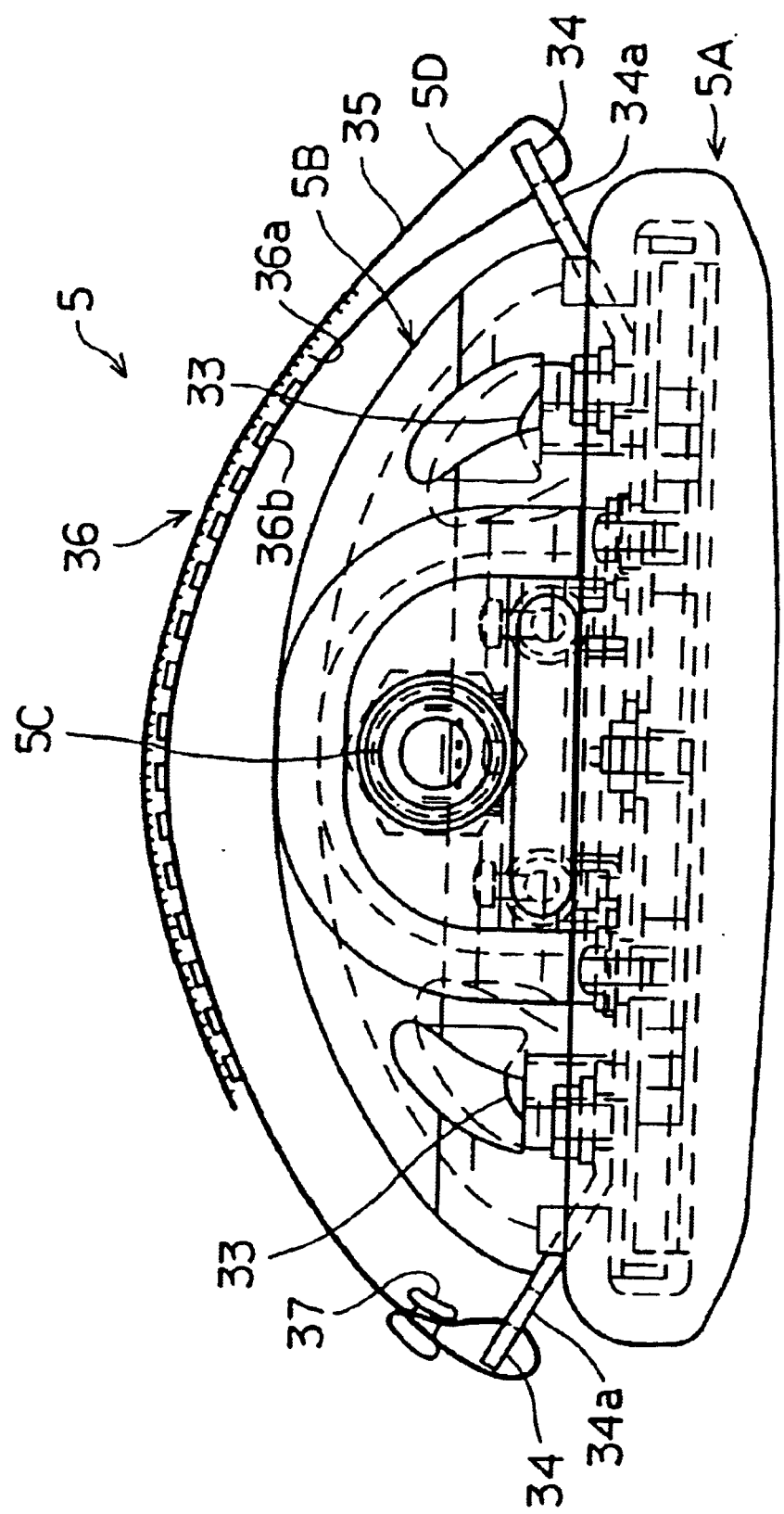
FIG. 7 is a right side view of the signal generating device.

FIG. 5 is a plan view showing the signal generating device 5, FIG. 6 is a section along 6—6 of FIG. 5, and FIG. 7 is a right side view of the signal generating device 5.

The signal generating device 5 includes a lower part 5A, an upper part 5B, a cord 5C and a belt 5D. A circular member comprised of four layers: i.e. first to third layers 20, 21, 22 placed one over another in this order, and a fourth layer 23 provided above the third layer 22 with a space 24 defined therebetween, is provided in the lower part 5A. The second layer 21 is made of a metal plate, and tubular portions 21a projecting upward are formed in four positions of the upper surface thereof. The third layer 22 is made of, e.g. a resin circular plate and is formed with through holes 22a in four positions corresponding to the tubular portions 21a. The fourth layer 23 is made of, e.g. a metal plate, and is formed with through holes 23a in four positions corresponding to the tubular portions 21a. The tubular portions 21a penetrate through the through holes 22a, 23a, and screws 25a having heads of a larger diameter than the through holes 22a, 23a are mounted into the tubular portions 21a from above to make the second to fourth layers 21, 22 and 23 into a unit. Further, ring-shaped spacers 25 for ensuring the space 24 are provided between the third and fourth layers 22, 23 while having the tubular portions 21a inserted through holes formed inside them. The spacers 25 are preferably made of, e.g. a foamed urethane or like soft material which can be restored to its original shape.

The first layer 20 is fitted on such a disk-shaped unit of the second to fourth layers 21, 22, 23 while covering the upper periphery, the entire side and bottom surfaces thereof. The bottom surface of the first layer 20 serves as a hitting surface A for hitting a body of a game player, members near him or the like. The first layer 20 is made of rubber or like elastic material in order to alleviate an impact.

Four tubular members 26 stand on the upper surface of the fourth layer 23. These tubular members 26 are mounted by inserting screws 27 into through holes formed inside the tubular members 26 from above and engaging the leading ends of the screws 27 into screw holes (not shown) formed in the fourth layer 23. Four corners of a printed circuit board 28 are tightly held between the four tubular members 26 and the heads of the screws 27. Specifically, through holes having a smaller diameter than the tubular members 26 and the heads of the screws 27 are formed at the four corners of the printed circuit board 28, and the shafts of the screws 27 are inserted into these through holes to hold the printed circuit board 28. An acceleration sensor 31 for detecting a swinging motion is provided on the upper surface of the printed circuit board 28, whereas an impact sensor 30 for detecting a hitting motion is provided on the upper surface of the fourth layer 23.

The upper part 5B provided on the lower part 5A includes a substantially semispherical cover 32, and an upper portion of the cover 32 partly project to form a projecting portion 32a. The cord 5C is drawn out through the projecting portion 32a. An other end of the cord 5C is coupled to the front surface 2b of the base table 2 (see FIG. 1). The cover 32 has its bottom surface held in contact with the upper end of the first layer 20 of the lower part 5A and is coupled to the lower part 5A via four screws 33.

Belt fixing members 34 are provided in two positions of the cover 32, and the belt 5D is mounted in mount holes 34a formed in the belt fixing devices 34. The belt 5D includes a belt main body 35 and a so-called surface fastener 36 having hooks 36a at one side and loops 36b at the other side. The belt main body 35 is an elongated strip, and one side thereof is introduced through one mount hole 34a and folded and has its overlapping portion fastened by a locking member 37, whereas the other side thereof is instructed through the other mount hole 34a and folded and has the surface fastener 36 mounted on its overlapping portion. By adjusting an overlapping area of the surface fastener 36, the signal generating device 5 can be securely fixed to a game player's hand regardless of the size of his hand, i.e. regardless of whether the game player is a child or an adult.

The impact sensor 30 takes advantage of a piezoelectric effect of a piezoelectric material using a ferroelectric. Directions in which the piezoelectric material elongates and contracts are assumed to be detecting directions. The impact sensor 30 is provided such that the detecting directions are normal to the fourth layer 23 and a detecting surface is in contact with the fourth layer 23.

On the other hand, the acceleration sensor 31 is adapted to output with respect to an X-axis and a Y-axis and is provided such that directions of the X- and Y-axes which are detecting directions are parallel to the bottom surface of the first layer 20 serving as the hitting surface A. Accordingly, the detecting directions of the acceleration sensor 31 are normal to the detecting directions of the impact sensor 30. The detecting directions of the acceleration sensor 31 and those of the impact sensor 30 may not be necessarily normal to each other. In other words, the detecting directions of the impact sensor 30 may obliquely intersect with the fourth layer 23 or the directions of the X- and Y-axes which are the detecting directions of the acceleration sensor 31 may be inclined with respect to the bottom surface of the first layer 20.

Detection signals of these sensors 30, 31 are sent to the control system 40 for executing a game via the cord 5C.

Although the impact sensor is used for detecting a hitting motion in the above description, an other sensor may be used instead. Further, although the acceleration sensor is used for detecting a swinging motion, an other sensor may be used instead.

Although the signal generating device has the hitting surface A in the above description, it may be a bar having no hitting surface A such as a bat or may be something like a glove in which the game player's hand is insertable. The signal generating device may be fitted on the game player's wrist instead of being held in hand.

Figure 8:
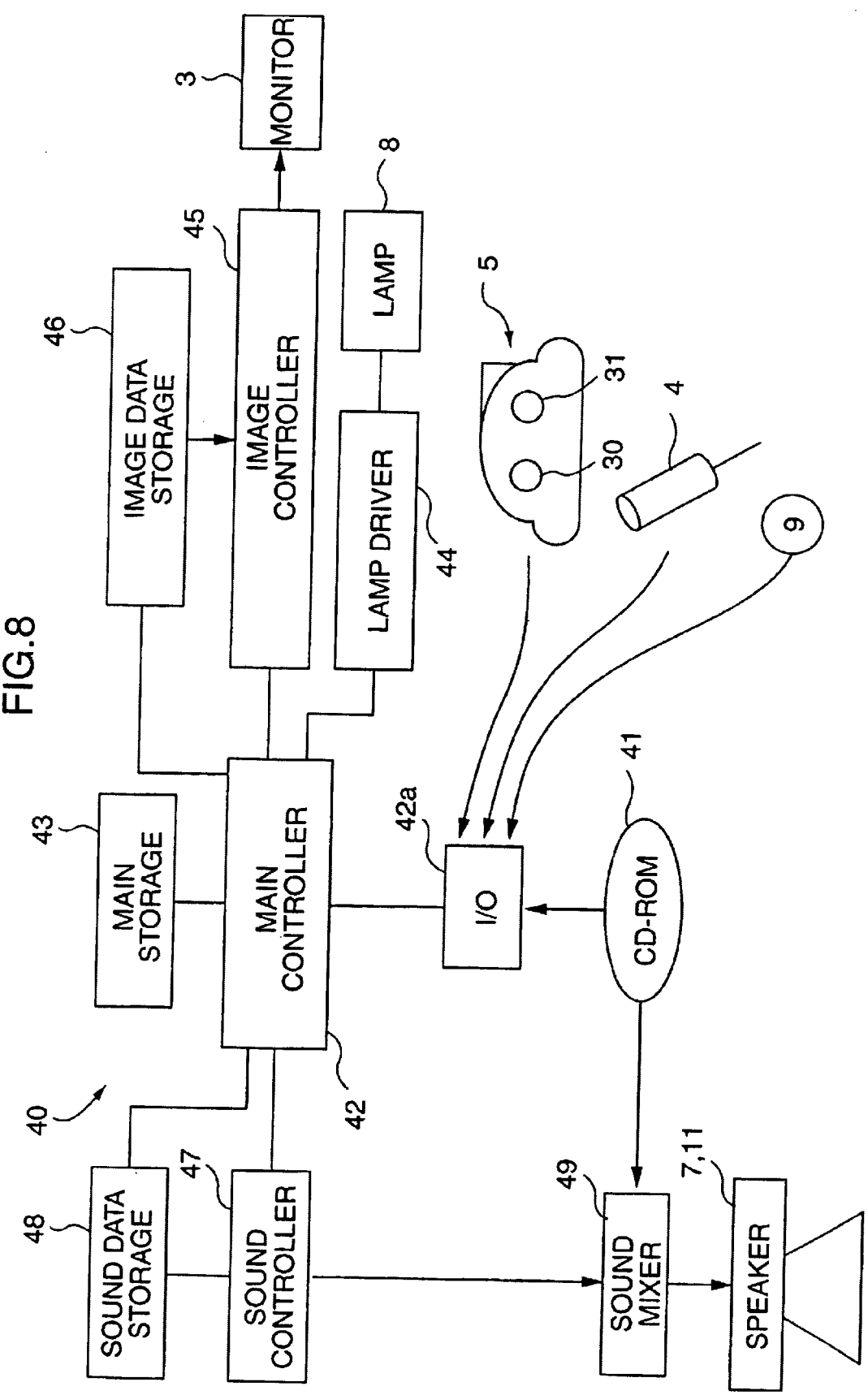
FIG. 8 is a block diagram showing the construction of a control system provided in the game system.

FIG. 8 is a block diagram showing the construction of the control system 40.

The control system 40 executes the game in accordance with a game program stored in a CD-ROM 41 as a second storage means and includes a microprocessor as a main component which provides a main controller 42, an image controller 45, a sound controller 47, a main storage 43 as a storage for the main controller 42, etc., an image data storage 46, a sound data storage 48, and a lamp driving device 44 for executing a processing necessary to turn on and off the lamps 8 in response to a command from the main controller 42.

Image data stored in the CD-ROM 41 are stored in the image data storage 46. The image controller 45 reads the image data from the image data storage 46 and outputs them to the monitor 3 at specified timings. FIGS. 9, 11 to 18 show contents of images displayed on the monitor 3.

Figure 9:
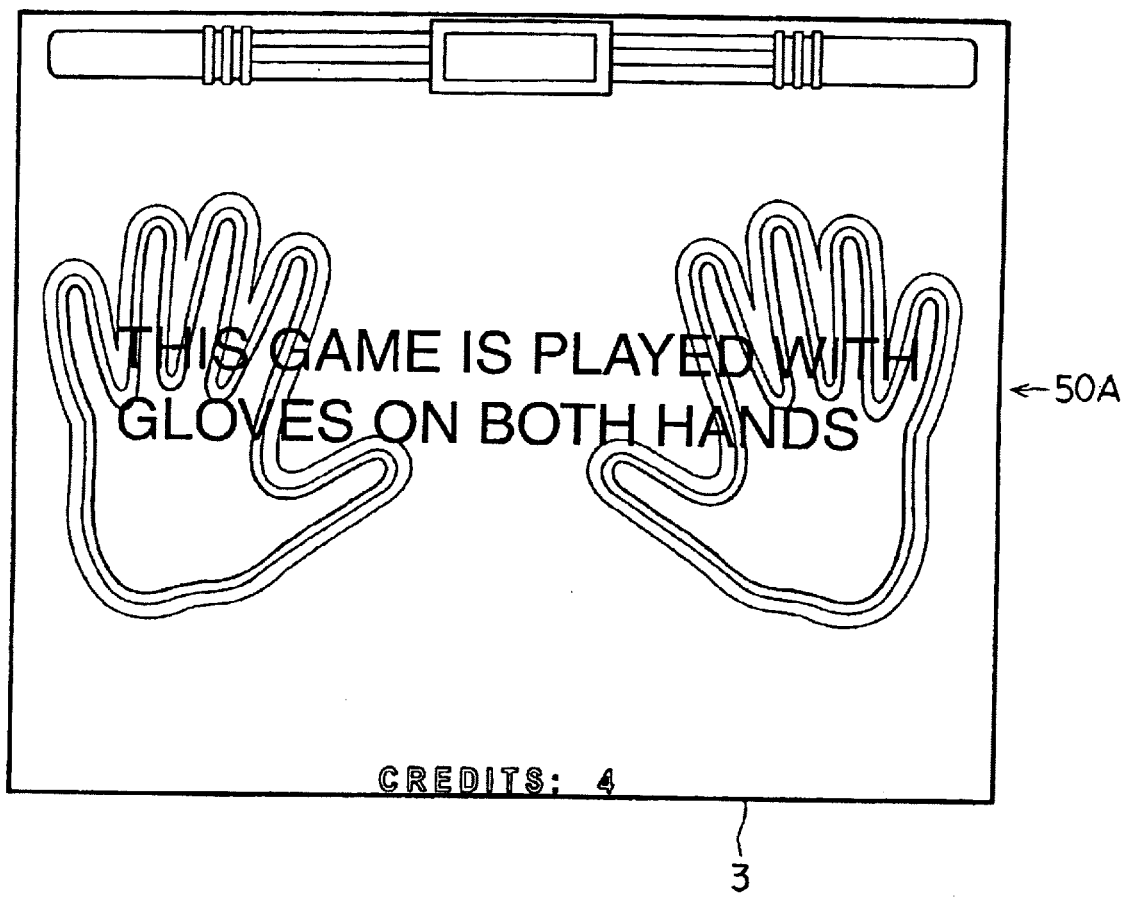
FIG. 9 is a diagram showing a content of an image (display content at the time of start) displayed on a monitor provided in the game system.

FIG. 9 shows a display content at the start. Identified by 50A is a display showing a content of explanation given at the start of the game. It should be noted that gloves in FIG. 9 refer to the signal generating devices 5.

Figure 11:
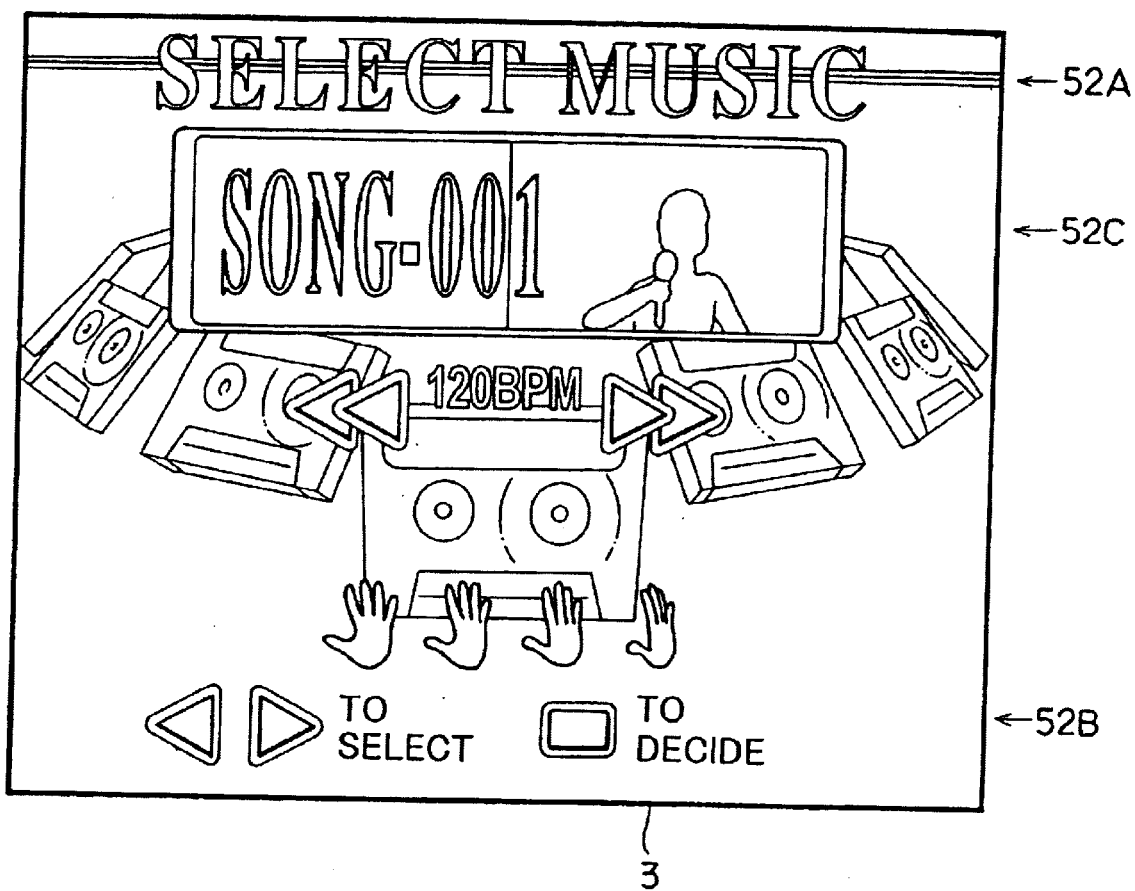
FIG. 11 is a diagram showing a content of an image (display content representing a content of a selection mode for music numbers during a game) displayed on the monitor.

FIG. 11 shows a display content representing a content of a selection mode of a music number played during the game. Identified by 52A, 52B, 52C are displays representing the music number selection mode, explanation of the selecting operation, and the selected music number. The selected music number is outputted as a background sound.

Figure 12:
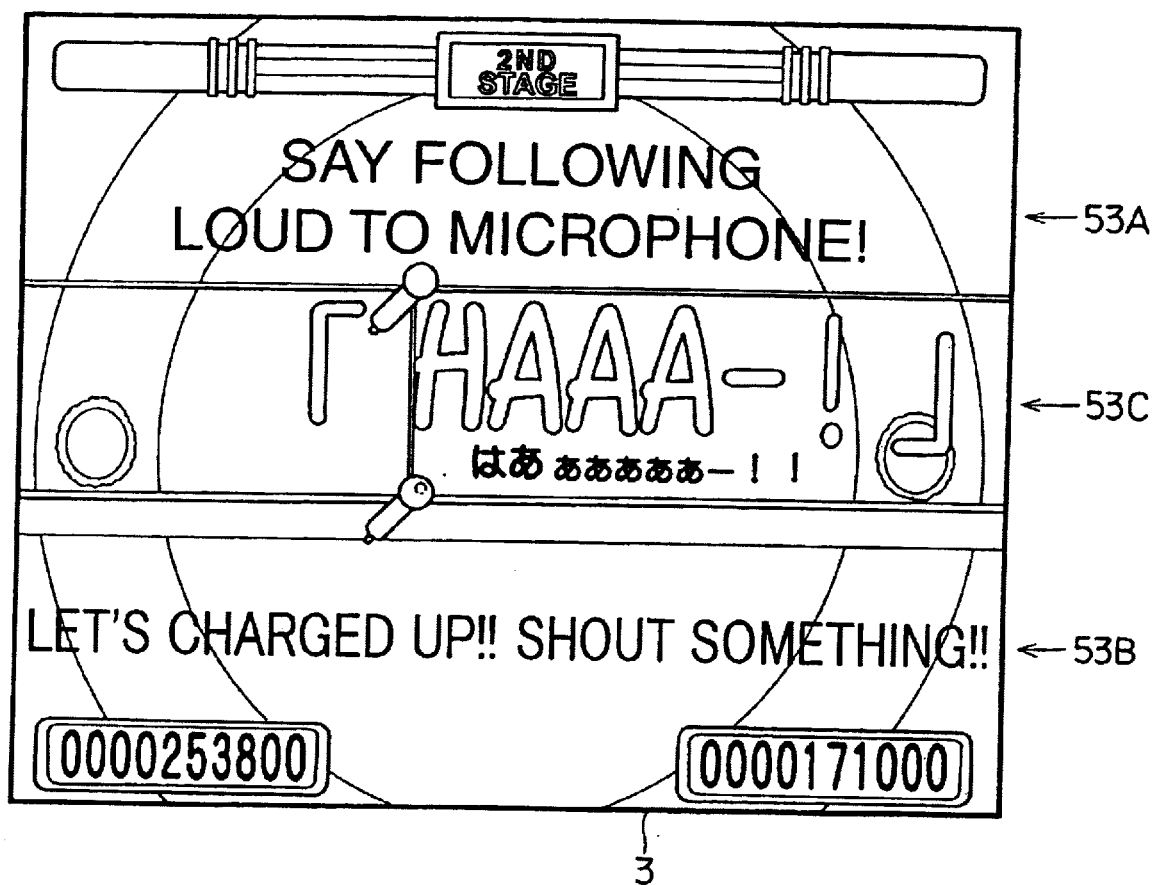
FIG. 12 is a diagram showing a content of an image (display content representing a content of instruction to shout at a microphone at the start of an introduction of a music number) displayed on the monitor.

FIG. 12 shows a display content representing contents of instructions to shout at the microphone 4 after the start of an introduction. Identified by 53A, 53B and 53G are displays representing contents of instructions and a display representing a shouting voice, e.g. "HAAA-!". At the time of this display, a disk jockey instructs a content of shouting and a shouting timing by voice. The shouting timing is instructed by temporarily changing the color of 5 letters, i.e. "HAAA—" of the display 53G of the display screen one by one at a specified speed from the left. The game player may shout following the color change. Instead of changing the color, a mark such as an arrow may be moved letter by letter. The moving or changing speed may not be constant, and may be partly changed. In this embodiment, two kinds of voices are inputted to the microphone 4 (hereinafter also referred to as a voice input member). However, in the case that the game player does not input his voice, sounds based on the sound data stored in the CD-ROM 41 are generated.

Figure 13A:
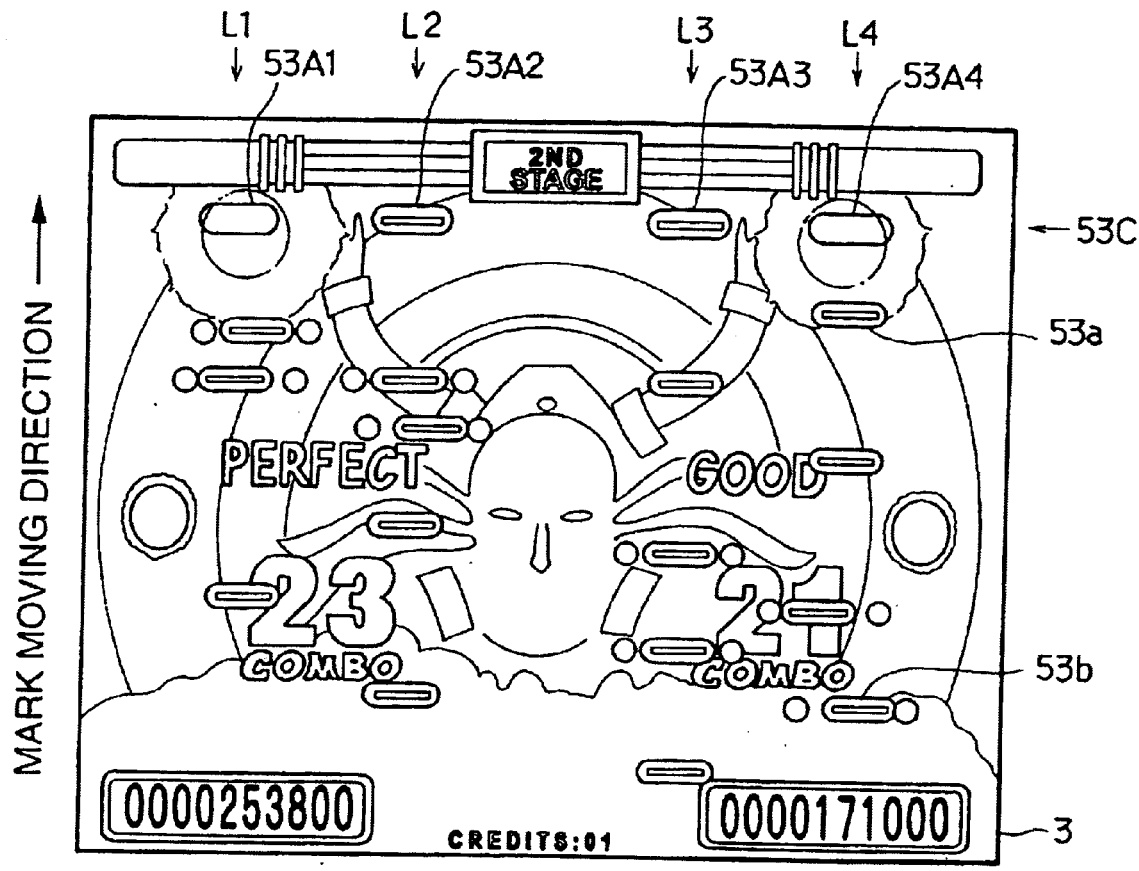
FIG. 13A is a diagram showing a content of an image (display content after the start of the game) displayed on the monitor.
Figure 13B:
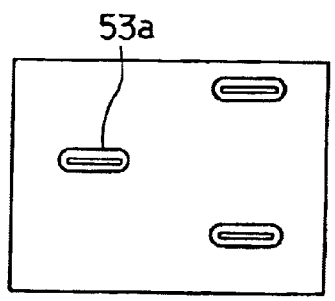
FIG. 13B is a diagram showing instruction marks for a hitting motion.
Figure 13C:
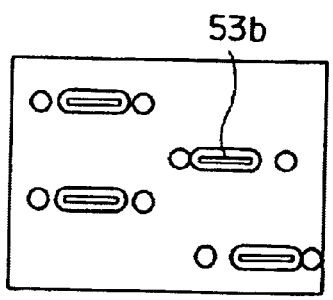
FIG. 13C is a diagram showing instruction marks for a swinging motion.

FIG. 13A shows a display content after the start of the game, FIG. 13B is a display showing instruction marks 53$a$ for the hitting motion, and FIG. 13C is a display showing instruction marks 53$b$ for the swinging motion.

L1, L2, L3, L4 in FIG. 13A are virtual lines on which the instruction marks (timing notes) 53$a$, 53$b$ move. The instruction marks 53$a$ for the hitting motion are so displayed as to move up straight on the respective virtual lines (scroll-display). On the other hand, the instruction marks 53$b$ for the swinging motion are so displayed as to move up straight on the respective virtual lines (scroll-display) and to transversely swing. L1, L2, L3, L4 are the virtual line for the left hand of the left player, the virtual line for the right hand of the left player, the virtual line for the left hand of the right player, and the virtual line for the right hand of the right player, respectively. In the case of the single-player game, the virtual lines L1, L2 are used because the left switch operation unit 14 is used.

The signal generating device 5 is hit or swung during a specified period within which the instruction marks 53$a$, 53$b$ coincide with reference marks 53A1, 53A2, 53A3, 53A4 provided in reference positions 53C on the respective virtual lines L1, L2, L3, L4. While this display is made, a background sound of the music number to be described later comes out through the loudspeakers 7 and 11. If the signal generating device 5 makes a corresponding motion during the specified period within which the instruction marks 53$a$, 53$b$ coincide with the reference marks 53A1, 53A2, 53A3, 53A4, either one kind of sound set in advance corresponding to each one of the instruction marks 52$a$, 53$b$ or the inputted voice comes out through the loudspeakers 7 and 11.

Figure 14:
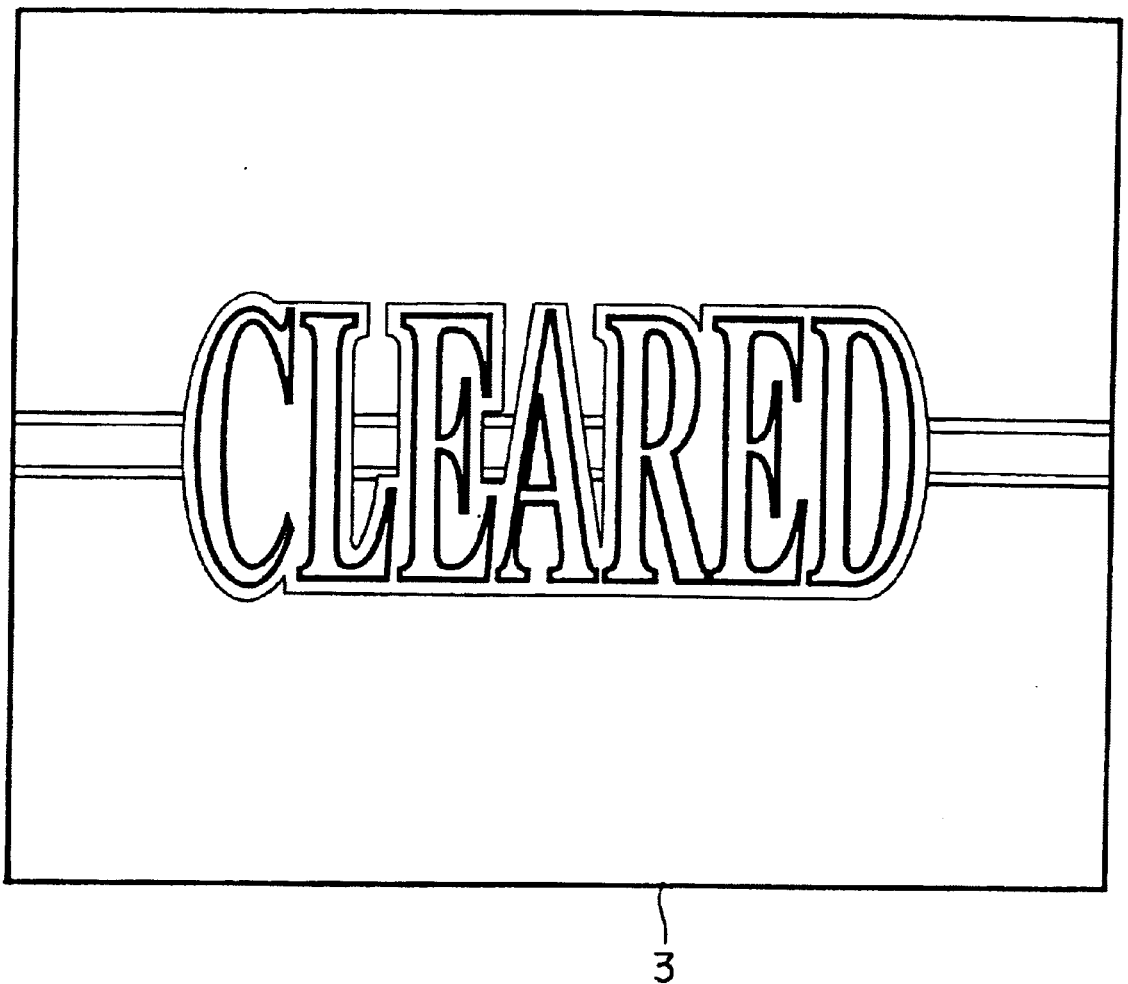
FIG. 14 is a diagram showing a content of an image (display content representing completion of the music number) displayed on the monitor.

FIG. 14 shows a display content representing the completion of the music number.

Figure 15:
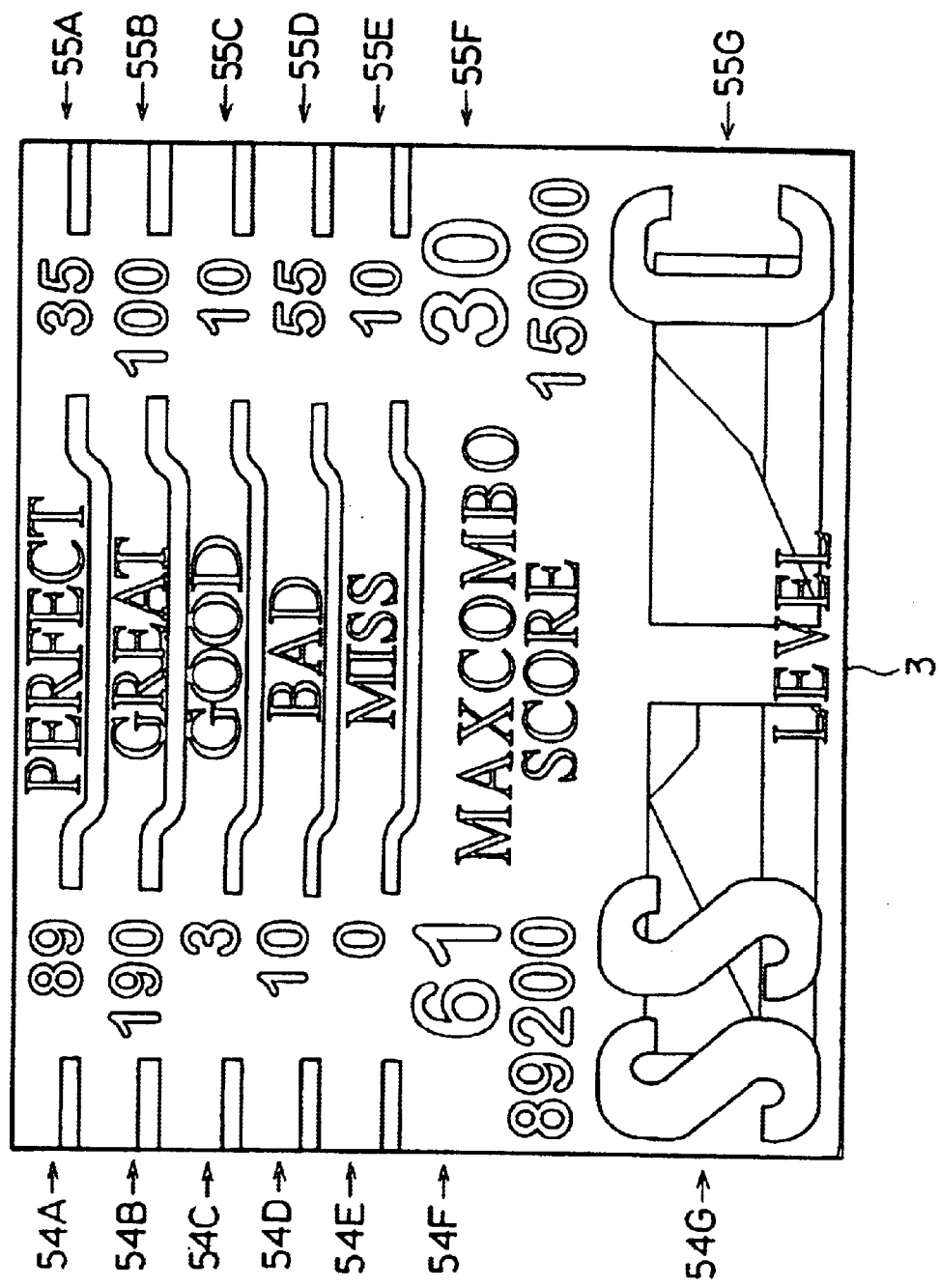
FIG. 15 is a diagram showing a content of an image (display content representing a game result) displayed on the monitor.

FIG. 15 shows a display content representing scores. The score at the left side of FIG. 15 is of the left player. The number of times of perfect-coincidence is displayed in a display area 54A; the number of times of great coincidence in a display area 54B; the number of times of good coincidence in a display area 54C; the number of times of bad coincidence in a display area 54D; the number of times of miss coincidence in a display area 54E; the number of maxcombo in a display area 54F; the score in a display area 54H; and a level of the game result in a display area 54G. Classifications of perfect, great, good, bad and miss coincidences, the maxcombo, the score and the level of the game result are described later.

On the other hand, the score at the right side of FIG. 15 is of the right player. The number of times of perfect coincidence is displayed in a display area 55A; the number of times of great coincidence in a display area 55B; the number of times of good coincidence in a display area 55C; the number of times of bad coincidence in a display area 55D; the number of times of miss coincidence in a display area 55E; the number of maxcombo in a display area 55F; the score in a display area 55H; and a level of the game result in a display area 55G.

Figure 16:
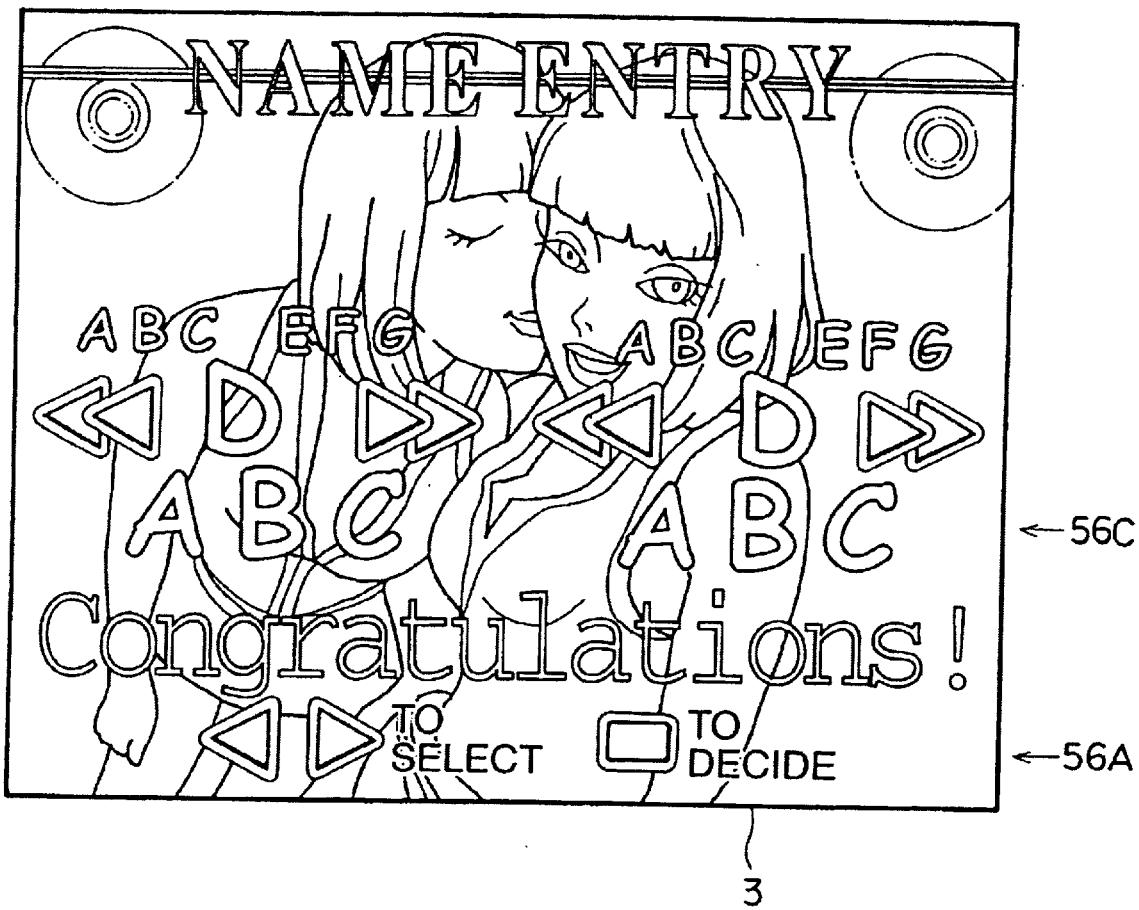
FIG. 16 is a diagram showing a content of an image (display content representing entry of a name) displayed on the monitor.

FIG. 16 shows a display content in the case that the name of the game player is entered in the ranking, wherein 56A denotes a display representing an operation-procedure and 56C denotes a display representing the entered name.

FIG. 17 shows a display content representing an example of the ranking in which top 10 of the game players who played the game and their scores are listed from the best player.

Figure 18:
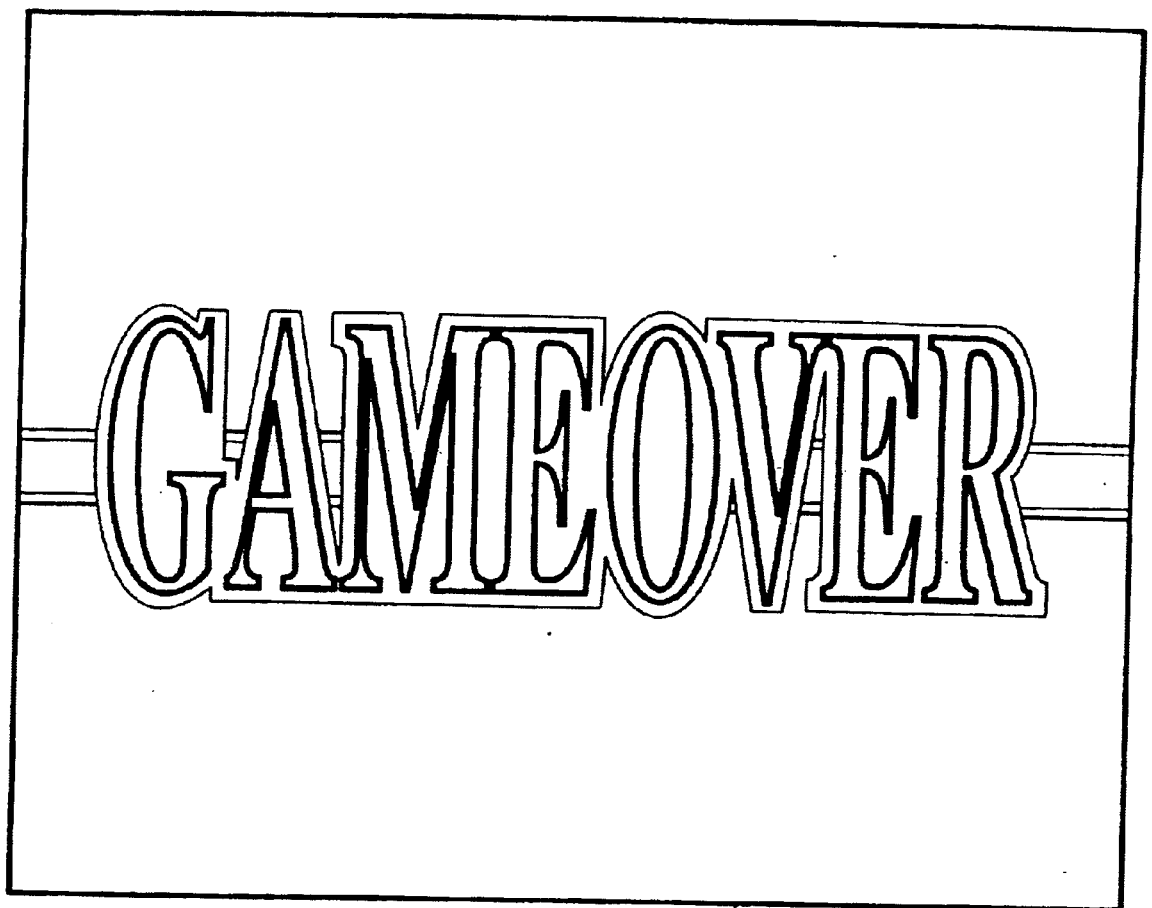
FIG. 18 is a diagram showing a content of an image (display content representing an end of a series of game contents) displayed on the monitor.

FIG. 18 shows a display content after the completion of a series of game contents. The game ends when this display is made.

Data used to make the above displays are stored together with background images in the image data storage 46, and the image controller 45 reads the image data from the image data storage 46 in the above sequence and contents of the control and cause the monitor 3 to display them.

An operating content as a program necessary to control the entire operation of the game system 1 is written in the main storage 43, and the data stored in the CD-ROM 41 are also stored therein. The main storage 43 may be comprised of, e.g. a ROM and a RAM or of only a ROM.

Figure 19:
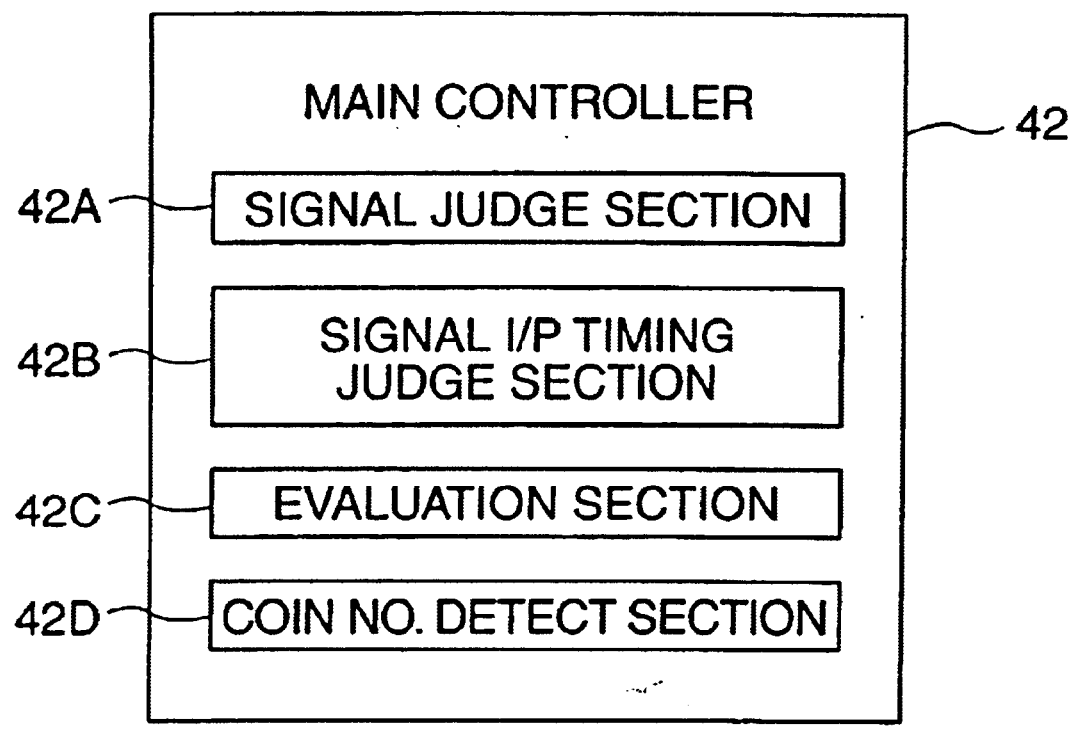
FIG. 19 is a construction diagram showing the construction of a main controller provided in the game system.

Detection signals from the impact sensor 30 and the acceleration sensor 31, sound data obtained by converting voices into electrical signals by the voice converting means including the microphones 4 (as voice input member) and further converting the electrical signals into digital signals by an unillustrated analog-to-digital converter, and a detection signal from an unillustrated coin detector provided in the coin inserting device 9 are inputted to the main controller 42 via an interface (I/O) 42*a*. The sound data inputted via the microphones 4 are sent to the sound data storage 48. The main controller 42 is, as shown in FIG. 19, provided with a signal judging section 42A, a signal input timing judging section 42B, an evaluating section 42C and a coin number detecting section 42D.

The signal judging section 42A judges whether the respective detection signals from the impact sensor 30 and the acceleration sensor 31 are specified signals. In this embodiment, the signal judging section 42A judges that a swinging motion has been made when only the detection signal from the acceleration sensor 31 is received, and a hitting motion has been made when the detection signal from the impact sensor 30 is received. This judgment is made because the signal is not outputted from the impact sensor 30 at the time of the swinging motion and both the impact sensor 30 and the acceleration sensor 31 may output detection signals at the time of the hitting motion. By making this judgment, an error detection can be prevented.

The signal input timing judging section 42B judges at which timings the respective detection signals from the impact sensor 30 and the acceleration sensor 31 were inputted. Four periods of, e.g. perfect, great, good and bad are set. These periods have such a specific construction that the good period shorter than the bad period is set inside the longest bad period, the great period shorter than the good period is set inside the good period, and the perfect period shorter than the great period is set inside the great period. The centers of the perfect, great, good and bad periods coincide with each other. The signal input timing judging section 42B judges in which period the signal input timing falls and judges that the corresponding motion is perfect if the signal was inputted within the perfect period, great if the signal was inputted within the great period, good if the signal was inputted within the good period, and bad if the signal was inputted within the bad period.

The evaluating section 42C estimates a game result based on a signal received from the signal input timing judging section 42B. Specifically, the evaluating section 42C calculates the numbers of the perfect, great, good and bad motions and judges a miss motion if a motion different from the instruction mark was made, no motion was made despite the fact that the instruction mark was displayed or the signal input timing corresponding to the motion made lies outside the bad period. Further, if the perfect motions continue, the largest of the numbers of continuous perfect motions is obtained as the maxcombo. In this example, SSS, SS, S, A, B, C, D, F are set as levels representing the game results. These numbers and letters are displayed on the monitor 3 (see FIG. 15). Here, the score and the level are determined based on a ratio of the number of the signals judged to be perfect, great or good by the signal input timing judging section 42B to a total number of the marks 53*a*, 53*b* set in the evaluating section 42C. The marks 53*a*, 53*b* may be those stored in the CD-ROM 41 beforehand. Alternatively, the evaluating section 42C or the like may successively add the number of the marks 53*a*, 53*b* in accordance with the program.

The coin number detecting section 42D judges that a single-player game is possible in the case that one detection signal is detected by the coin detector (not shown) while judging that a duel-player game is possible in the case that two detection signals is detected by the coin detector. Whether the single-player game or the duel-player game is to be played is actually decided by operating the operation button 14*c* as described above.

The sound data storage 48 is so constructed as to store, for example, about 60 kinds of sound data in the respective storage areas. The sound data stored in the storage areas include the sound data stored in the CD-ROM 41 and signals (sound data) obtained by converting voices given by a game player into electrical signals by the microphones 4 and further converting the electrical signals into digital signals by the unillustrated analog-to-digital converter. Such sound data are set in one-to-one correspondence with the instruction marks 53*a*, 53*b*.

Figures 20, 21:
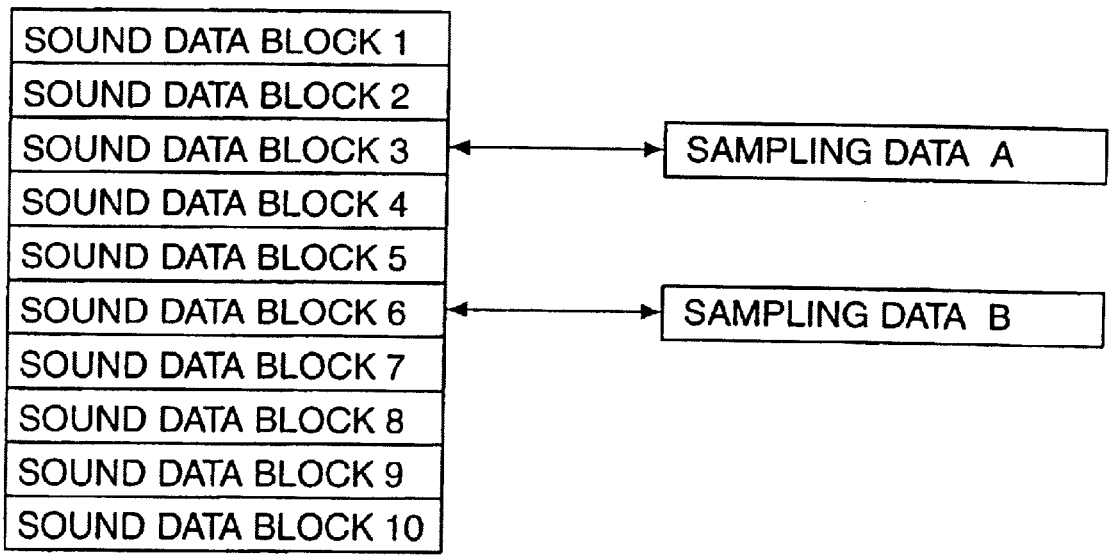
FIG. 20 is a diagram showing storage area in a sound data storage provided in the game system, and how sound data are stored.
FIG. 21 is a table showing contents of sound modulations performed by a sound controller provided in the game system.

FIG. 20 is a diagram showing part of the storage areas of the sound data storage 48. In this shown example, the sound data stored in the CD-ROM 41 are stored in the storage areas other than sound data blocks 3 and 5, and the sound data relating to the voices sampled by the microphones 4 are stored in the sound data blocks 3 and 5. In the case that no voice is inputted by the game player or the like, the sound data set beforehand are stored. Here, the sound data blocks 3 and 5 are referred to as sound block data A and B, respectively.

In the sound data storage 48 are also stored number data relating to address numbers of the storage areas of the sound data storage 48 storing the respective sound data described above. If the signal judging section 42A judges the detection signal inputted from the impact sensor 30 or the acceleration sensor 31 to the main controller 42 is a specified signal, the main controller sends a signal to the sound controller 47, which in turn reads the sound data of the corresponding address number from the sound data storage 48 and outputs it to a sound mixing device 49. This output is made based on a timing at which the sensor 30 or 31 generated the signal. However, in the case of the miss or bad motion, the sound output may not be performed. In other words, the sound data may be read from the sound data storage 48 and outputted if the signal has been inputted to the signal input timing judging section 42B during the good, great or perfect period.

Figure 24:
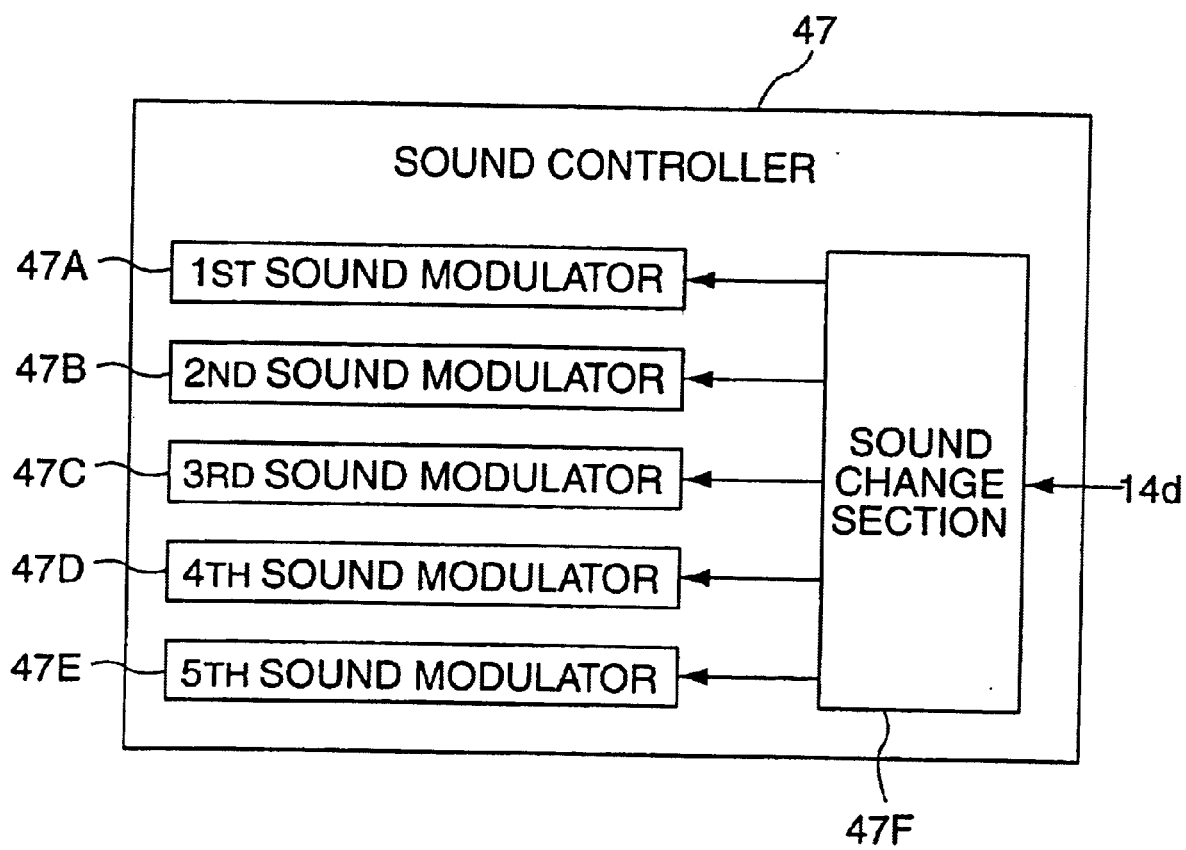
FIG. 24 is a block diagram showing the sound controller.

The sound controller 47 has a function of processing the sound data, e.g. a sound modulating function. FIG. 24 is a block diagram showing the sound modulating function of the sound controller 47. The sound controller 47 includes first to fifth sound modulating sections 47A to 47E and a sound changing section 47F. The first sound modulating section 47A is of the frequency modulating type (hereinafter, modulation 1); the second sound modulating section 47B of the amplitude modulating type (hereinafter, modulation 2); the third sound modulating section 47C of the type changing the sound level of voices lying within at least part of frequency regions divided at specified intervals (hereinafter, modulation 3); the fourth sound modulating section 47D of the type thinning out voices lying within part of the frequency regions (hereinafter, modulation 4); and the fifth sound modulating section 47E of the type expanding and compressing at least part of sound waves with respect to a time axis (hereinafter, modulation 5). The sound changing section 47F further changes the degree of sound modulation of these sound modulating sections 47A to 47E.

In the sound controller 47 thus constructed, the sound data read from the sound data storage 48 is modulated by the corresponding sound modulating section 47A to 47E and/or sound changing section 47F according to the preprogrammed type of modulation for the corresponding one of the instruction marks 53a, 53b. The type (or degree) of modulation is changed by the sound changing section 47F for inputting a signal corresponding to the operational position of the slide switch (referred also to as a slider) 14d. For instance, the types of sound modulation at the upper part of FIG. 10 are selected if the slide switch 14d is set at left-side positions, whereas those at the lower part of FIG. 10 are selected if the slide switch 14d is set at right-side positions.

The sound data modulated by the sound controller 47 are outputted to the sound mixing device 49.

FIG. 21 is a table showing an example of sound modulations applied to the voices sampled by the microphones 4.

In this shown example, the sound data blocks 1, 4 are not modulated because being the sound data stored in the CD-ROM 41, whereas the sound data blocks A and B storing the sound data relating to the voices sampled by the microphones 4 are subjected to the modulations 1 and 3 for the corresponding ones of the instruction marks 53a, 53b. The modulation which can be changed according to a slid amount of the slide switch 14d can be applied to all the sound data read from the sound data storage 48. Although the modulations 1 and 3 are performed in the example of FIG. 21, desired one(s) of the modulations 1 to 5 can be applied.

The sound mixing device 49 has a digital-to-analog converting function and is adapted to covert the sound data from the sound controller 47 into an analog signal and output it as a real sound through the loudspeakers 7 and 11. The sound data of the background sound stored in the CD-ROM 41 is directly inputted to the sound mixing device 49, which in turn converts the received sound data into an analog signal and outputs as a real sound through the loudspeakers 7 and 11.

The CD-ROM 41 is detachably mounted in the game system 1. The data and program stored in the CD-ROM 41 are read by an unillustrated data reading means, and image-relating ones of the read data and program are stored in the image data storage 46, sound-relating ones thereof are stored in the sound data storage 47, and the remainder is stored in the main storage 43.

The image data stored in the CD-ROM 41 include, for example, the displays 50A to 56C displayed on the monitor 3 as shown in FIGS. 9 to 18, and the image control programs stored in the CD-ROM 41 include, for example, the image data reading timings. The sound data stored in the CD-ROM 41 include, for example, the sound data to be stored in the sound data storage 48 (excluding the voices inputted through the microphones 4) and the background sounds, and the sound control programs stored in the CD-ROM 41 include, for example, the sound data reading timings.

The remaining data and programs stored in the CD-ROM 41 include, for example, a lamp turning program. The lamp turning program is inputted to the main controller 42 via the interface 42a, the main controller 42 sends a command signal based on this program to the lamp driving device 44, and the lamp driving device 44 controllably turns on the corresponding one(s) of a plurality of lamps 8 in accordance with the received command signal from the main controller 42. Since the CD-ROM 41 is detachably mounted as described above, another storage medium storing other music numbers and different positions of the instruction marks can be set in the game system 1.

Although the main controller, the image controller and the sound controller are separately formed in FIG. 8, they may be formed into a unit or divided into two units according to the present invention.

Figure 22:
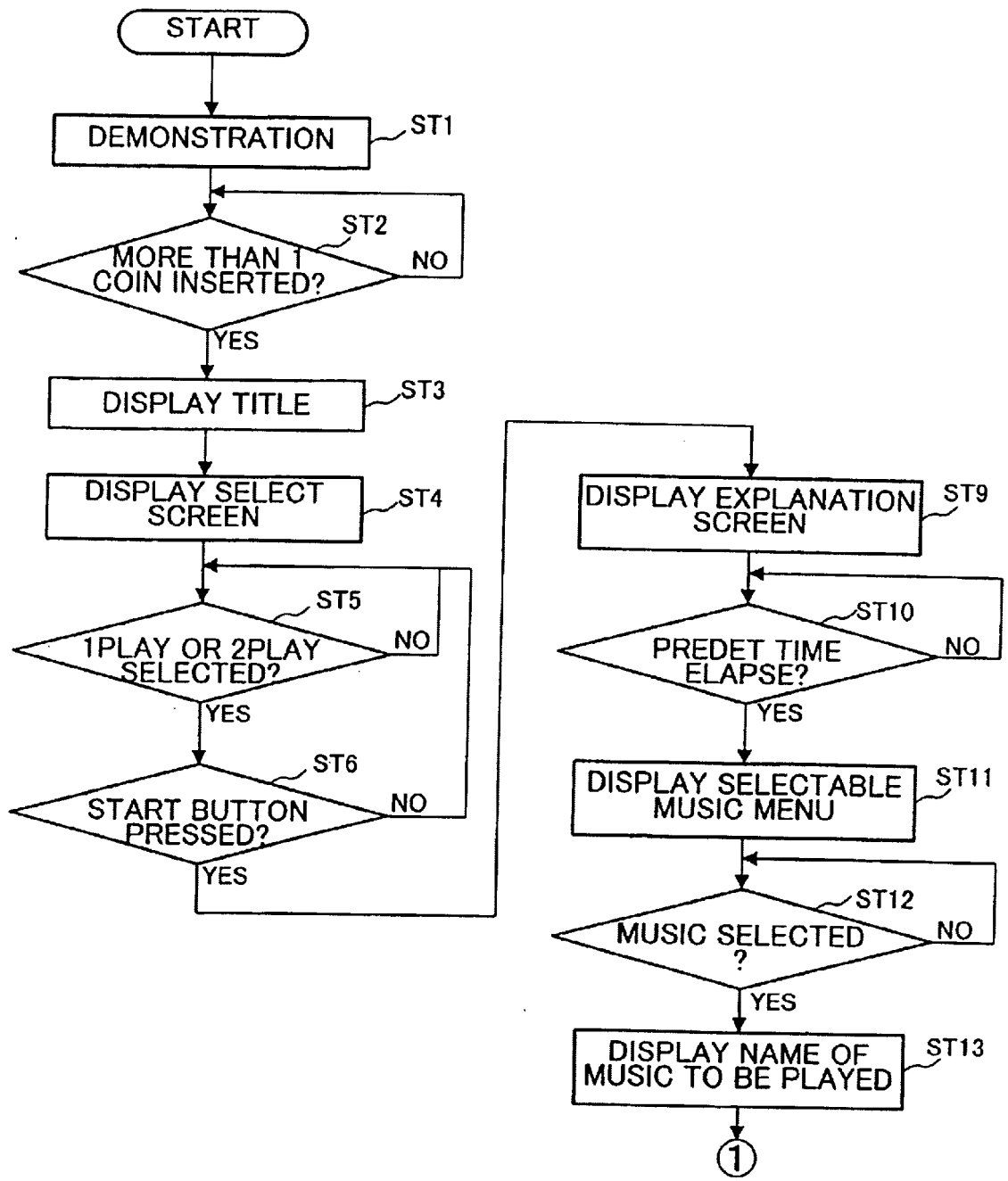
FIGS. 22 and 23 are a flow chart showing contents of controls executed in the game system.
Figure 23:
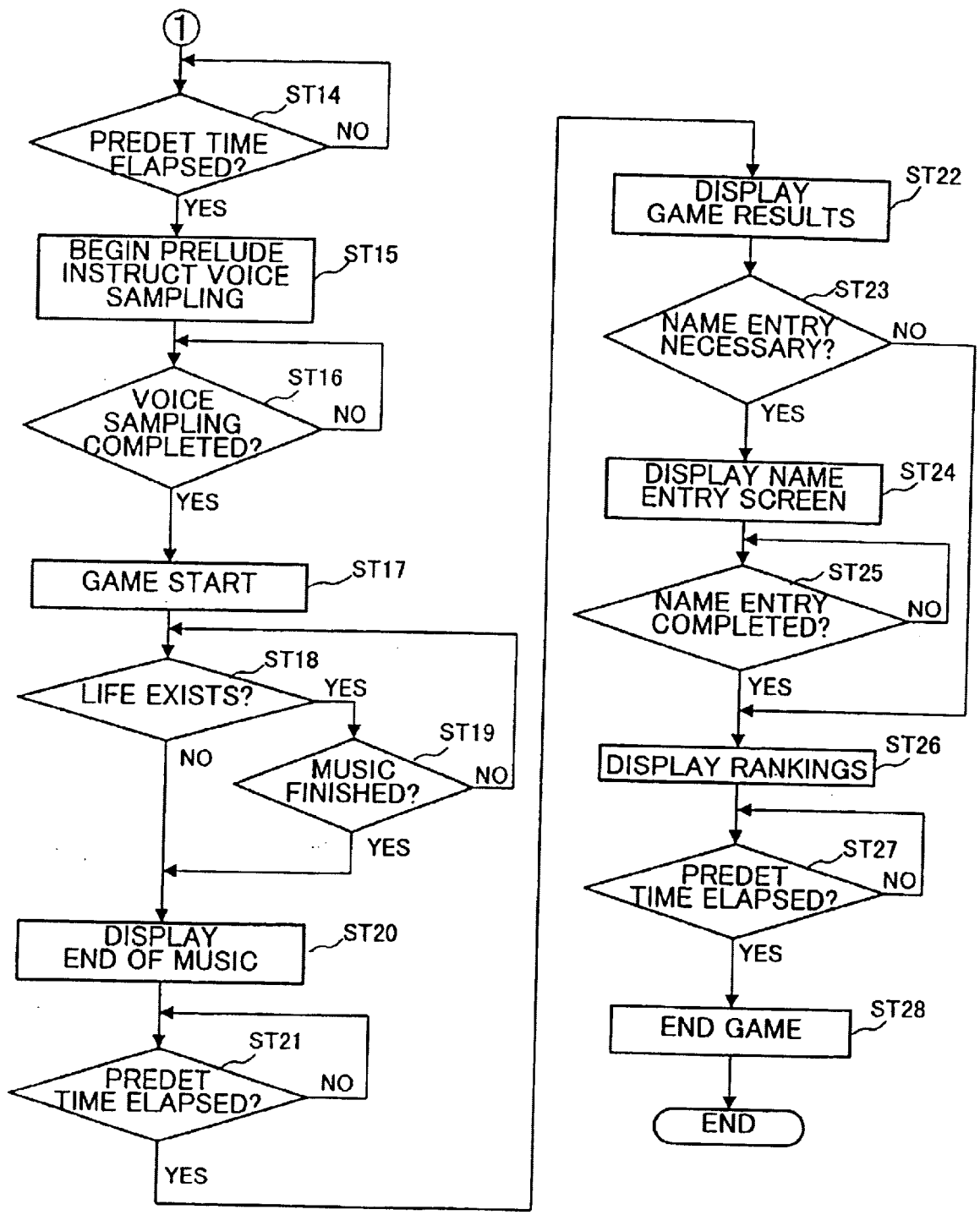

FIGS. 22 and 23 are a flow chart executed in the game system according to this embodiment.

First, prior to the start of the game, in Step ST1, displays and sound output (demonstration) are made to introduce the contents of the game, operation procedure, ranking up to the present, etc., and the image shown in FIG. 9 is, for example, displayed on the monitor 3, and how to play the game is explained through the loudspeakers 7 and 11. Simultaneously, it is discriminated whether one or more coins have been inserted (Step ST2).

If one or more coins have been inserted, a game title, e.g. "Rap Freaks' is displayed on the monitor 3 for a predetermined time (Step ST3), and a specified selection screen is then displayed on the monitor 3 (Step ST4).

A game player selects a single-player game or a dual-player game. It is then successively discriminated whether the selection has been completed (Step ST5) and whether a start button has been pushed (Step ST6). When the start button is discriminated to have been pushed, a specified explanation screen is displayed (Step ST9).

Subsequently, it is discriminated whether a predetermined time has elapsed (Step ST10). If the discrimination result is affirmative, a multitude of selectable music numbers are displayed on the monitor 3 (Step ST11). During this display, the game player selects a desired music number from the displayed music numbers.

It is then discriminated whether the selection of the music number has been completed (Step ST12), and the name of the selected music number is displayed on the monitor 3 as shown in FIG. 11 (Step ST13) if the selection has been completed.

Subsequently, it is discriminated whether another predetermined time has elapsed (Step ST14). If the discrimination result is affirmative, an introduction is started and a voice sampling instruction is given by displaying the screen for the voice sampling shown in FIG. 12 and outputting the voice through the loudspeakers (Step ST15). In accordance with this instruction, the game player speaks or shouts a sentence of the instructed content at the microphone 4, and his voice is stored in the specified storage area of the sound data storage 48.

It is then discriminated whether the voice sampling has been completed (Step ST16), and the game is started (Step ST17) if the voice sampling has been completed. As the game is started, the game content shown in FIG. 13A is displayed on the monitor 3, and the game player moves the signal generating member 5 in response to the instruction marks 53a for the hitting motion and the instruction marks 53b for the swinging motion. During the game, a life is administered by the accumulation of evaluations made by the main controller 42. This life administration is such that a life gauge increases upon a good evaluation (perfect, great) and decreases upon a bad evaluation (bad, miss). If the life gauge runs short, the game is over.

Subsequently, it is discriminated whether the life still exists and whether the music number has ended (Steps ST18, ST19).

If the life is discriminated to have ended (NO in Step ST18) or if the music number is discriminated to have ended (YES in Step ST19), a display is made to inform the end of the music number (Step ST20). Specifically, a message "CLEARED" as shown in FIG. 14 is displayed on the monitor 3 if the music number is played to the end, whereas a message "FAILURE" is displayed if the music number is ended upon exhaustion of the life.

Subsequently, it is discriminated whether a predetermined time has elapsed (Step ST21). If the discrimination result is affirmative, a game result as shown in FIG. 15 is displayed on the monitor 3 (Step ST22). This game result is a result of evaluation of the evaluating section 42C as to whether the game player made the hitting motions and the swinging motions in response to the instruction marks 53a, 53b within a predetermined period while holding the signal generating device 5.

It is then discriminated whether the entry of the name is necessary (Step ST23). This discrimination is made by the evaluating section 42C by discriminating whether the score of the game player is equal to or above a reference value upon the end of the music number, i.e. whether this score satisfies a name entry condition. If the entry of the name is necessary, a name entry screen shown in FIG. 16 is displayed on the monitor 3 (Step ST24), and the game player performs a name entry operation accordingly.

Subsequently, it is discriminated whether the entry of the name has been completed (Step ST25), and a ranking as shown in FIG. 17 is displayed (Step ST26) if the discrimination result is affirmative. If the entry of the name is not necessary (NO in Step ST23), this routine directly proceeds to Step ST26 to display the ranking.

Subsequently, it is discriminated whether a predetermined time has elapsed (Step ST27). If the discrimination result is affirmative, the game is ended and a message "GAME OVER" shown in FIG. 18 is displayed on the monitor 3 (Step ST28).

According to this embodiment, when the game player makes a motion based on the content of an instruction relating to an electrical signal data, the sound generating means generates a voice corresponding to the electrical signal data which is inputted through the voice input member in response to the content of the instruction. Thus, not only the specified sounds set in the game system beforehand, but also voices inputted and converted into the electrical signal data by the converting means (voice converting means) such as those of the game player himself and those of the game player's friend can be outputted from the game system, thereby making the game extremely interesting and enjoyable.

Although the two signal generating members are held in both hands of each of the two game players in the foregoing embodiment, one signal generating member may be held in one hand of each of the two game players according to the present invention. In such a case, the instruction marks may be displayed using two of the virtual lines L1 to L4. Further, the inventive game system may be constructed such that a single game player plays the game.

The present invention is not limited to the foregoing embodiment, and may be embodied as follows.

(1) The instruction marks are scroll-displayed by being moved with respect to the reference marks in specified positions in the foregoing embodiment. However, according to the present invention, the reference marks may be scroll-displayed while the instruction marks are arranged in specified positions. In such a case, marks having substantially the same shape as the instruction marks of the foregoing embodiment or arrows may be used as reference marks.

(2) In the foregoing embodiment, the game is such that the hitting and swinging motions are made in response to the instruction marks 53a, 53b and the voice inputted through the microphone 4 is outputted based on such motions. However, the present invention is not limited thereto, and other kinds of motions may be made in response to other kinds of instructions, and the voice inputted through the microphone 4 may be outputted based on such motions. An example of the other kind of motion in response to the other kind of instruction is as follows. An operation lever stands on a plane in such a manner that it can be inclined in any direction of 360° from its vertical position, and inclining directions of the operation lever are displayed on a display screen as contents of instructions. The operation lever is inclined in the instructed direction (may be located within a specified angle range). This is merely an example, and various other motions may be adopted.

(3) Although the sound controller 47 includes the first to fifth sound modulating sections 47A to 47E in the foregoing embodiment, it may include only one, two or more of these five sound modulating sections 47A to 47E according to the present invention.

As described in detail above, in the inventive game system, when the game player makes a motion based on the content of instruction relating to the electrical signal data, the sound generating means generates the predetermined voice corresponding to the electrical signal data based on the content of instruction. Accordingly, not only the specified sounds set in the game system beforehand, but also voices converted into the electrical signal data by the converting means such as those of the game player himself and those of the game player's friend can be outputted from the game system, thereby making the game extremely interesting and enjoyable.

Summing up the aforementioned descriptions, a game system of this invention in which a game player make motions in response to contents of instructions displayed on a display screen and generating predetermined sounds corresponding to the contents of instructions, the game system comprising:

a voice converting means having an voice input member for inputting voices of the game player and for converting the voices input through the voice input member into electrical signal data, a storage means for storing the electrical signal data obtained by the voice converting means together with predetermined sound-relating data corresponding to the contents of instructions, a sound generating means for generating voices from the corresponding electrical signal data based on the motions of the game player corresponding to the contents of instructions when the game player makes motions in response to the contents of instructions.

In this game system, when the game player makes a motion based on the content of instruction relating to the electrical signal data, the sound generating means generates the voice inputted through the voice input member corresponding to the electrical signal data based on the content of instruction.

Accordingly, not only the specified sounds set in the game system beforehand, but also voices inputted and converted into the electrical signal data by the converting means such as those of the game player himself and those of the game player's friend can be outputted from the game system, thereby making the game extremely interesting and enjoyable.

In the game system, the sound generating means may include a data processing means for processing the electrical signal data of the voices and generates voices corresponding to the electrical signal data processed by the data processing means.

With this construction, since the data processing means of the sound generating means processes the electrical signal data of the voices, voices different from those of the game player and his friend can be outputted from the game system.

To this end, the data processing means may have one, two or more of a frequency modulating function; an amplitude modulating function; a function of changing the sound level of voices lying within at least part of frequency ranges divided at specified intervals; a function of thinning out sounds lying within part of the frequency ranges; and a function of expanding and compressing at least part of sound waves with respect to a time axis.

The aforementioned game system may further comprises a signal generating means for generating a signal based on the motion made by the game player, wherein the sound generating means outputs a sound when the signal generating means generates a signal within a predetermined period.

With this construction, the game can be made further interesting since no sound is outputted unless the game player makes the motion within the predetermined period.

Moreover, the game system may further comprises a second storage means in addition to the storage means, wherein a second electrical signal data stored in the second storage means is stored in the storage means, and the sound generating means generates a sound corresponding to the second electrical signal data.

Furthermore, in the aforementioned game system, the data processing means processes the second electrical signal data, and the sound generating means generates a sound based on the processed second electrical signal data.

The aforementioned game system may further comprise a changing means for changing a degree of data processing by the data processing means, wherein the changing means changes the degree of data processing applied to at least one of the electrical signal data and the second electrical signal data.

With this construction, eccentric or strange voices can be outputted since the game player can further change the degree (or type) of sound processing, with the result that the game can be made even more interesting.

In the aforementioned game system, sounds relating to the second electrical signal data and background sounds may be stored in the second storage means, and the sound generating means outputs the background sounds without modification.

With this construction, the voices of, e.g. the game player, his friend and others can be ad-libbed while the background sounds are outputted.

In the aforementioned game system, an instruction regarding a timing to input a voice to the voice input member of the voice converting means is preferred to be displayed on the display screen at a specified moving speed.

Here, the moving speed of the means for instructing the timing may be constant or partly changed.

In the aforementioned game system, the sound generating means may generate a predetermined sound corresponding to the electrical signal data instead of generating a voice if no voice is input to the voice input member of the voice converting means.

This invention is based on a Japanese Patent Application Serial No. 11-253686 filed on Sep. 7, 1999, thus the contents thereof are incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A game system in which a game player makes motions in response to contents of instructions displayed on a display screen, the game system generating predetermined sounds corresponding to the contents of instructions, the game system comprising:

voice converting means having a voice input member for inputting voices of the game player in association with a game and for converting the voices input through the voice input member into electrical signal data;

storage means for storing the electrical signal data obtained by the voice converting means together with predetermined sound-relating data corresponding to the contents of instructions;

motion detecting means for detecting at least one of a hitting motion and a swinging motion of the game player; and sound generating means for generating reproduced voices from the corresponding electrical signal data corresponding to the voices of the game player previously inputted by the game player based on either of the hitting and swinging motions of the game player corresponding to the contents of instructions when the game player makes the motions in response to the contents of instructions.

2. A game system according to claim 1, wherein the sound generating means includes a data processing means for processing the electrical signal data of the voices and generates voices corresponding to the electrical signal data processed by the data processing means.

3. A game system according to claim 2, wherein the data processing means includes at least one of a frequency modulating function, an amplitude modulating function, a function of changing the sound level of voices lying within at least part of frequency ranges divided at specified intervals, a function of thinning out sounds lying within part of the frequency ranges, and a function of expanding and compressing at least part of sound waves with respect to a time axis.

4. A game system according to claim 1, further comprising signal generating means for generating a signal based on the motions made by the game player, the sound generating means outputting a sound when the signal generating means generates a signal within a predetermined period with respect to a timing instruction.

5. A game system according to claim 1, further comprising a second storage means in addition to the storage means, a second electrical signal data stored in the second storage means being stored in the storage means, and the sound generating means generating a sound corresponding to the second electrical signal data.

6. A game system according to claim 2, further comprising a second storage means in addition to the storage means, a second electrical signal data stored in the second storage means being stored in the storage means, and the sound generating means generating a sound corresponding to the second electrical signal data.

7. A game system according to claim 6, wherein the data processing means processes the second electrical signal data, and the sound generating means generates a sound based on the processed second electrical signal data.

8. A game system according to claim 6, further comprising changing means for changing a degree of data processing by the data processing means wherein the changing means changing the degree of data processing applied to at least one of the electrical signal data and the second electrical signal data to achieve a change in sound of the voices which are generated.

9. A game system according to claim 5, wherein the second storage means receives, as stored data, sounds relating to the second electrical signal data and background sounds, and the sound generating means outputs the background sounds without modification.

10. A game system according to claim 1, further comprising means for issuing an instruction regarding a timing to input a voice to the voice input member of the voice converting means, said instruction being displayed on the display screen at a specified moving speed.

11. A game system according to claim 1, wherein the sound generating means generates a predetermined sound corresponding to the electrical signal data instead of generating a voice if no voice is input to the voice input member of the voice converting means.

12. A game system according to claim 4, wherein said timing instruction is given by a first mark, displayed on the display screen, which is stationary and a second mark, displayed on the display screen, which is movable with respect to the first mark and the timing instruction is when the first mark and the second mark coincide to each other.

13. A game system according to claim 1, further comprising:
evaluation means for evaluating the performance of said hitting and swinging motions of the game player based upon said instruction contents.

14. A game system in which a game player makes motions in response to contents of instructions displayed on a display screen, the game system generating predetermined sounds corresponding to the contents of instructions, the game system comprising:
voice converting means having a voice input member for inputting voices and for converting the voices input through the voice input member into electrical signal data;
storage means for storing the electrical signal data obtained by the voice converting means together with predetermined sound-relating data corresponding to the contents of instructions,
motion detecting means for detecting the motions of the game player;
sound generating means for generating voices from the corresponding electrical signal data based on the motions of the game player corresponding to the contents of instructions when the game player makes the motions in response to the contents of instructions; and
signal generating means for generating a signal based on the motions made by the game player, the sound generating means outputting a sound when the signal generating means generates a signal within a predetermined period with respect to a timing instruction, said timing instruction being given by a first mark, displayed on the display screen, which is stationary and a second mark, displayed on the display screen, which is movable with respect to the first mark, the timing instruction being when the first mark and the second mark coincide to each other, said signal generating means including an impact sensor and an acceleration sensor to output corresponding detection signals.

15. A game system according to claim 14, further comprising a signal input timing judging section for judging which predetermined time periods with respect to the timing instruction the signal generated by the signal generating means falls into.

16. A game system according to claim 15, wherein said predetermined time periods include a first time period and a second time period, the first time period being longer than the second time period.

17. A game system according to claim 16, wherein the sound generating means generates the voices from the corresponding electrical signal data only when the signal generating means generates the signal within the second time period with respect to the timing instruction.

18. A game system in which a game player makes motions in response to contents of instructions displayed on a display screen, the game system generating predetermined sounds corresponding to the contents of instructions, the game system comprising:
voice converting means having a voice input member for inputting voices and for converting the voices input through the voice input member into electrical signal data;
storage means for storing the electrical signal data obtained by the voice converting means together with predetermined sound-relating data corresponding to the contents of instructions;
motion detecting means for detecting the motions of the game player; and
sound generating means for generating voices from the corresponding electrical signal data based on the motions of the game player corresponding to the contents of instructions when the game player makes the motions in response to the contents of instructions; and
signal generating means for generating a signal based on the motions made by the game player, the sound generating means outputting a sound when the signal generating means generates a signal within a predetermined period with respect to a timing instruction, said signal generating means including an acceleration sensor to output one of said detection signals.

* * * * *